United States Patent [19]

Muranishi et al.

[11] Patent Number: 5,508,805
[45] Date of Patent: Apr. 16, 1996

[54] INTERFEROMETER, OPTICAL SCANNING TYPE TUNNELING MICROSCOPE AND OPTICAL PROBE

[75] Inventors: Masaru Muranishi, Ibaraki; Hidehiko Kando, Matsudo; Mamoru Kainuma, Ibaraki; Katsuhiko Kimura, Ibaraki; Shozo Saegusa, Ibaraki; Katsuyuki Tanaka, Ibaraki, all of Japan

[73] Assignee: Hitachi, Ltd., Tokyo, Japan

[21] Appl. No.: 267,431

[22] Filed: Jun. 29, 1994

[30]  Foreign Application Priority Data

Jun. 29, 1993  [JP]  Japan ................................ 5-158535

[51] Int. Cl.$^6$ .......................... G01B 9/02; H01J 3/14
[52] U.S. Cl. .................. 356/345; 356/359; 250/234; 250/216
[58] Field of Search ..................... 356/359, 345, 356/360; 250/234, 306, 307, 216

[56] References Cited

U.S. PATENT DOCUMENTS

| | | | |
|---|---|---|---|
| 4,917,462 | 4/1990 | Lewis et al. | 250/216 |
| 5,231,501 | 6/1994 | Swanson et al. | 356/345 |
| 5,324,935 | 6/1994 | Yasutake | 250/234 |
| 5,354,985 | 10/1994 | Quate | 250/306 |
| 5,362,963 | 11/1994 | Kopelman et al. | 250/306 |

*Primary Examiner*—Samuel A. Turner
*Assistant Examiner*—Robert Kim
*Attorney, Agent, or Firm*—Antonelli, Terry, Stout & Kraus

[57]  ABSTRACT

In an optical scanning type tunneling microscope, reference light is prepared in addition to light used to be projected to a sample, and this reference light and also light picked up from an optical probe are caused to interfere with each other. As a result, phase information of light about a region having a very smaller dimension than a wavelength of the light irradiated from alight source can be acquired.

44 Claims, 21 Drawing Sheets

INTERFEROMETER, OPTICAL SCANNING TYPE TUNNELING MICROSCOPE AND OPTICAL PROBE

BACKGROUND OF THE INVENTION

The present invention relates to an optical scanning type tunneling microscope used to optically observe a very small (fine) structure of a sample surface, and also to a measuring apparatus for performing a characteristic measurement of an optical element.

As to the scanning type tunneling microscope, various patent applications have been filed in Japan, e.g., JP-A-4-77605 (1992) and JP-A-4-162340 (1992).

Further, the optical scanning type tunneling microscope is described in the publication "OPTICS" (page 780) vol. 21, No. 11, November 1992 issued from Japanese Optics Institute, and the publication "APPLIED PHYSICS" (page 612) vol. 61, issued in 1992 from Japanese Applied Physics Institute.

As is known in the art, the optical scanning type tunneling microscopes may function as a means capable of optically observing light picked up or extracted from a very small region. However, these conventional optical scanning type tunneling microscopes could measure only intensity or strengths of light, and a shape of the very small region, but could not measure a phase of light and length of an optical path.

Moreover, no means for measuring a phase of light propagated through an optical waveguide path has been developed.

SUMMARY OF THE INVENTION

An object of the present invention is to provide a means capable of measuring phase information of light picked up from a very small region, and also to provide a means capable of measuring a phase of light confined in an optical waveguide. Another object of the present invention is to provide an optical scanning type tunneling microscope equipped with a means capable of measuring phase information of light about a very small region.

To achieve the above-described objects, in an interferometer, according to one aspect of the present invention, comprising a light source; splitting means for splitting light irradiated from said light source into a plurality of light; interfering means for causing said plurality of light to interfere with each other; and detecting means for detecting said plurality of light which have interfered with each other, the above-described interferometer comprises at least one optical probe for selectively picking up at least one of said plural light split by said splitting means from a region having a dimension equal to, or shorter than a wavelength of said light irradiated from the light source; and said light picked up from said optical probe and said light split by said splitting means are caused to interfere with each other by said interfering means.

In an interferometer, according to another aspect of the present invention, comprising a light source; interfering means for causing a plurality of light to interfere with each other; and detecting means for detecting said plurality of light which have interfered with each other, the above-explained interferometer further comprises a plurality of optical probes for selectively picked up the light irradiated from said light source from a region present in a portion of space;

said light picked up from said optical probes are caused to interfere with each other by said interfering means; and a dimension of a region from which the light is selectively picked up by at least one of said plural optical reference light.

Accordingly to another aspect of the present invention, in an optical scanning type tunneling microscope comprising:

a light source;

an optical system for projecting light irradiated from said light source to a sample;

an optical probe for selectively picked up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-described optical scanning type tunneling microscope further comprises interfering means for splitting the light irradiated from said light source into reference light and measuring light before projecting said light to the sample, for projecting at least a portion of said measuring light to said sample, and for causing the light picked up from said optical probe and at least a portion of said reference light to be interfered with each other; and the interfered light on said interfering means, are detected by said photo detector, thereby extracting phase information about the light picked up from said optical probe.

According to another aspect of the present invention, in an optical scanning type tunneling microscope comprising:

a light source;

an optical system for projection light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-described optical probe is made of a transparent substance, and has a plurality of sharp projections at a tip portion thereof, and also is capable of deriving phase information about said transmitted light, said reflected light, said scattered light, or said evanescent wave generated near said sample.

Also, according to another aspect of the present invention, in an optical scanning type tunneling microscope comprising:

a light source;

an optical system for projecting light irradiated from said light source to a sample;

an optical probe for selectively picked up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-described optical probe has such a structure that either a hollow object made of an opaque substance, or a transparent substance to which an opaque substance is attached, and said opaque substance owns either one, or a plurality of very small holes, and also said optical probe is capable of picking up phase information about said transmitted light, said reflected light, said scattered light, or said evanescent wave generated near said sample.

Accordingly to another aspect of the present invention, in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-explained optical probe has such a structure that a dielectric film is formed on a semiconductor substrate, and a film made of an opaque substance having either one, or a plurality of very small holes is formed on said dielectric film, and furthermore a photo detector for converting the picked up light into an electric signal is integrated on a portion under said plurality of very small holes on said semiconductor substrate, whereby said optical probe is capable of deriving phase information about said transmitted light, said reflected light, said scattered light, or said evanescent wave generated from near said sample.

Further, according to another aspect of the present invention, in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light derived by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, a plurality of said optical probes are employed, at least portions of said plurality of light picked up from said respective optical probes are caused to interfere with each other for a detection purpose, and said optical probe is capable of deriving phase information about said transmitted light, said reflected light, or said evanescent wave generated near said sample.

According to another aspect of the present invention, in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-explained light irradiated from said light source is split into a plurality of light before being projected to said sample, and at least two sets of said split plural light are projected to said sample along two different direction.

Moreover, according to another aspect of the present invention, in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-described optical probe is capable of deriving phase information about said transmitted light, said reflected light, said scattered light, or said evanescent wave generated near said sample.

Then, according to another aspect of the present invention, in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region f said sample surface is scanned by said optical probe; and a process circuit for recording the output from said photo detector and for extracting information about said sample based upon said recorded output in synchronism with the scanning operation of said optical probe, the above-described optical probe has such a structure that a dielectric film is formed on a semiconductor substrate, and a film made of an opaque substance having either one, or a plurality of very small holes is formed on said dielectric film, and furthermore said photo detector is integrated on a portion under said plurality of very small holes on said semiconductor substrate.

Also, according to another aspect of the present invention, in an optical probe used in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-described optical probe has a plurality of sharp projections made of a transparent substance at edge portions thereof, and is capable of deriving phase information about transmitted light, reflected light, scattered light, or an evanescent wave generated near said sample.

Then, according to a further aspect of the present invention, in an optical probe used in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from a region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-explained optical probe has such a structure that either a hollow object made of an opaque substance, or a transparent substance to which an opaque substance is attached, and said opaque substance owns either one, or a plurality of very small holes.

Furthermore, according to a still further aspect of the present invention, in an optical probe used in an optical scanning type tunneling microscope comprising:

a light source;

an optical system for projecting light irradiated from said light source to a sample;

an optical probe for selectively picking up transmitted light, reflected light, scattered light generated from said sample by receiving said light, or an evanescent wave generated near said sample by receiving said light, from region of a portion located near a surface of said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, the above-described optical probe has such a structure that a dielectric film is formed on a semiconductor substrate, and a film made of an opaque substance having either one, or a plurality of very small holes is formed on said dielectric film, and furthermore a photo detector for converting the light picked up into an electric signal is integrated on a portion under said plurality of very small holes on said semiconductor substrate.

In accordance with the present invention, the reference light is prepared in addition to the measuring light which is projected to the sample. The light projected to the sample becomes transmitted light, reflected light, scattered light, or an evanescent wave present near the sample. Any one of the above-described various light is selectively picked up from a partial region on the sample surface near the sample by employing the optical probe. This light picked up from the optical probe is caused to interfere with the reference light, so that the phase of the light for the narrow region from which the light has been picked up by the optical probe can be measured. The phases of the respective places are measured by scanning the optical probe with regard to a preselected region of the sample surface, whereby the overall phase conditions of this preselected region can also be measured.

Further, in accordance with the present invention, the reference light is prepared in addition to the measuring light which is projected to the sample. The light projected to the sample becomes transmitted light, reflected light, scattered light, or an evanescent wave present near the sample. Any one of the above-described various light is selectively picked up from a partial region on the sample surface near the sample by employing the optical probe. At this time, a plurality of light are picked up from more than two regions, and are caused to interfere with each other, so that a phase difference between two sets of the above-described light from the respective regions can be measured. A phase condition may be recognized based upon this phase difference information.

Other features and advantages of the present invention may be apparent from the following descriptions of embodiments according to the present invention.

DESCRIPTION OF THE PREFERRED EMBODIMENTS

Referring now to FIG. 1 through 24, optical scanning type tunneling microscopes according to various embodiments of the present invention will be described.

Figure 1:
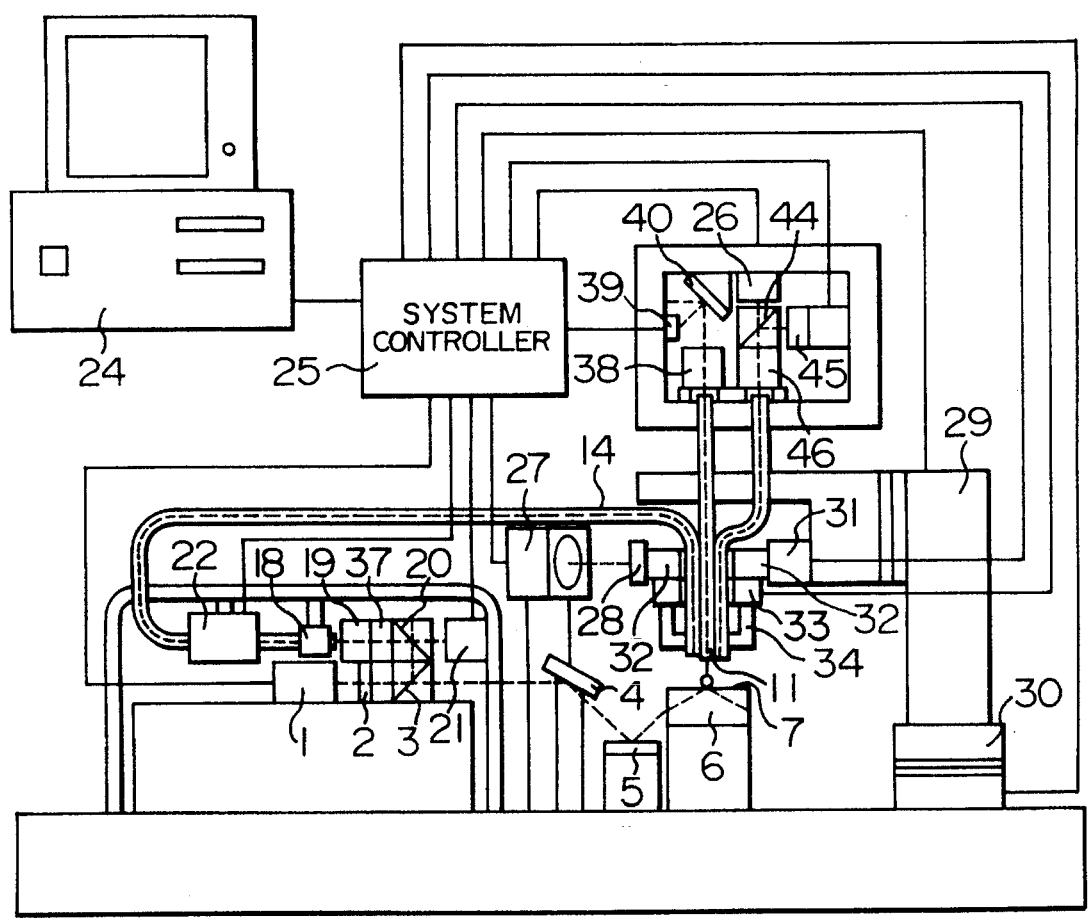
FIG. 1 schematically shows an optical system of an optical scanning type tunneling microscope according to a first embodiment of the present invention.
Figure 2:
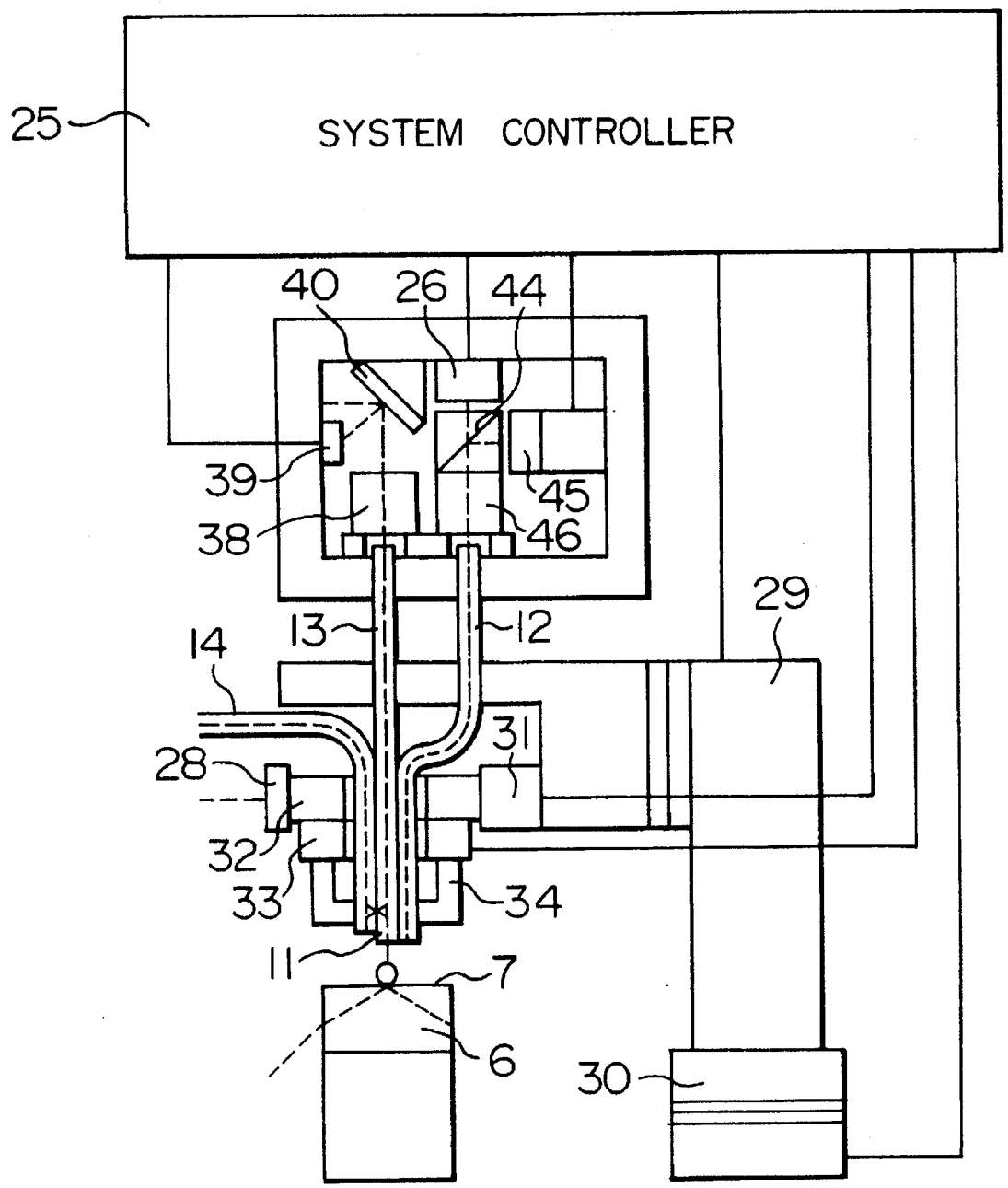
FIG. 2 is an enlarged view of an interferometer system employed in the optical scanning type tunneling microscope of FIG. 1.
Figure 3:
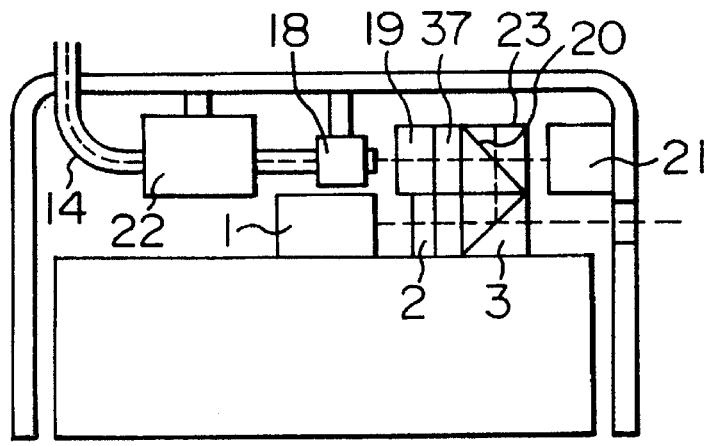
FIG. 3 is an enlarged view of an optical source unit employed in the tunneling microscope of FIG. 1.
Figure 4:
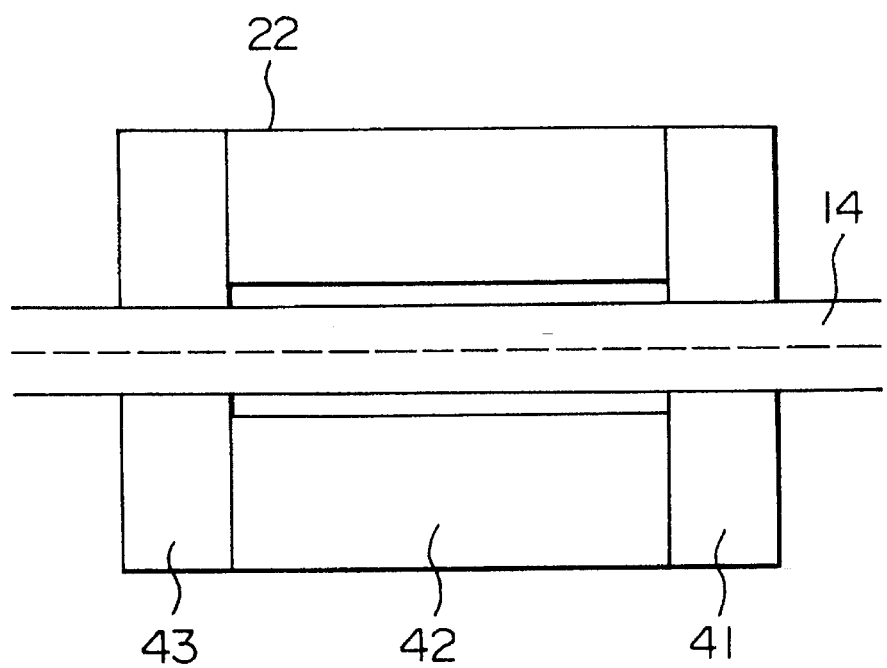
FIG. 4 is a sectional view of a phase modulation element employed in the optical source unit of FIG. 3.
Figure 5:
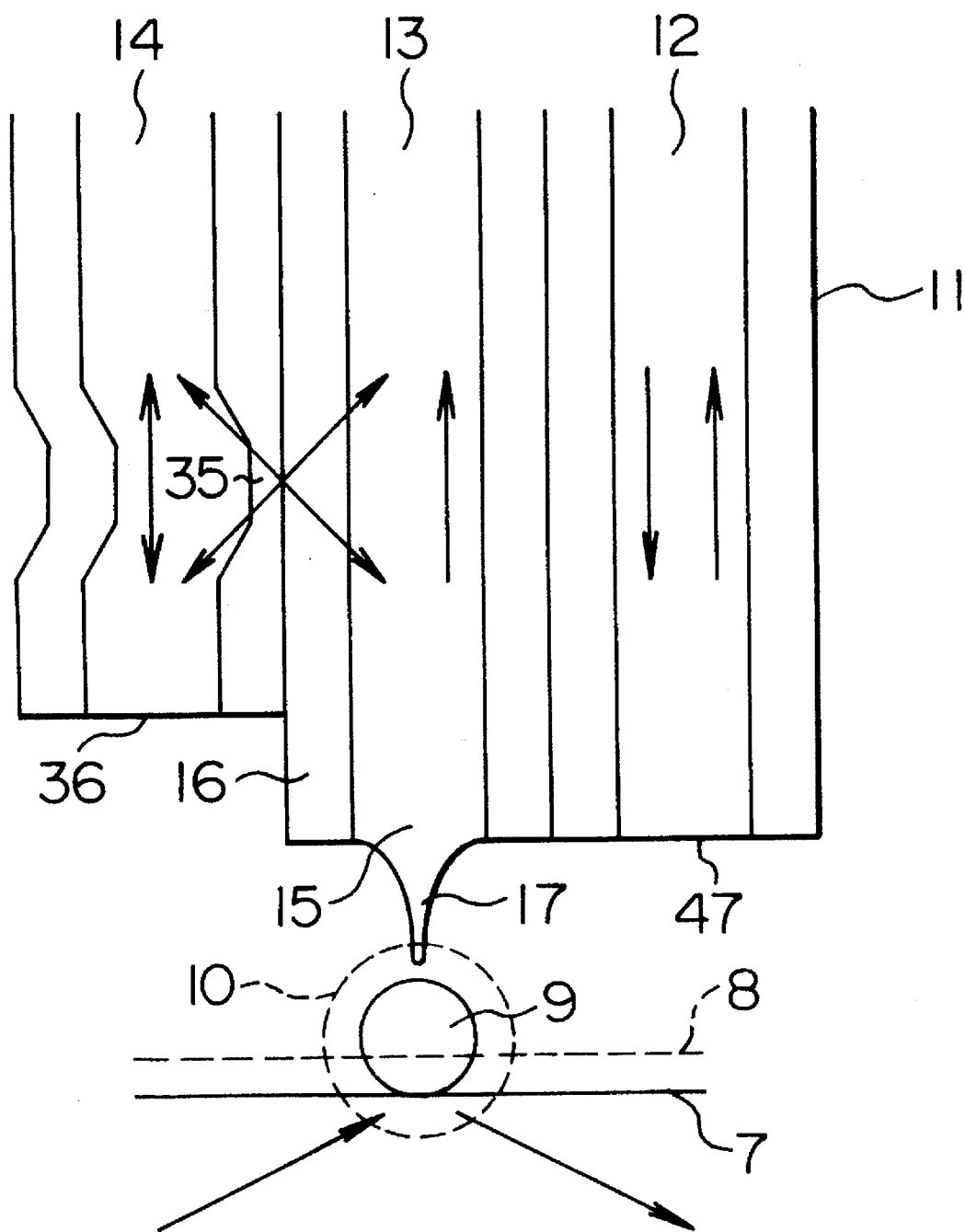
FIG. 5 is an enlarged sectional view of an optical probe employed in the tunneling microscope of FIG. 1.

First, a description will now be made of an optical scanning type tunneling microscope according to a first embodiment of the present invention. FIG. 1 is a schematic diagram of an optical system employed in the first optical scanning type tunneling microscope as the first embodiment of the present invention. FIG. 2 is an enlarged view for indicating an interferometer optical system employed in this first tunneling microscope. FIG. 3 is an enlarged view for indicating an optical source unit used in the first tunneling microscope. FIG. 4 is a sectional view of a phase modulation element employed in the first tunneling microscope. FIG. 5 is an enlarged sectional view of an optical probe tip portion of the first tunneling microscope.

As illustrated in FIG. 1, a system controller 25 causes semiconductor lasers 1 and 26 to emit laser beam in response to an instruction of a computer 24. Displacement of a mirror 28 mounted on a holding member 32 is measured by a laser interferometer 27 in response to this instruction. Both of this laser interferometer 27 and the mirror 28 are mounted within a plane perpendicular to the vertical direction, as viewed in FIG. 1, along a direction angled at 45 degrees with respect to the horizontal direction. Two dimensional displacement of the mirror 28 may also be measured by this laser interferometer 27, that is present within the plane perpendicular to the vertical direction of FIG. 1.

The system controller 25 supplies currents to an x/y-stage 30 and a piezoelectric element 31 in order that the above-described displacement measurement results are compared with the instruction of the computer 24 to make the displacement of the mirror 28 coincident with the instruction value of the computer 24. This computer 24 gives the instruction value to the system controller 25 so that a predetermined region of a surface 7 of a glass substrate 6 is scanned by an optical probe 11.

The x/y-stage 30 causes a z-stage 29 to be moved within a plane along the horizontal direction shown in FIG. 1 and the vertical direction to the drawing plane of FIG. 1. The piezoelectric element 31 relatively moves a holding member 32 within the same plane as the x/y-stage 30 with respect to the z-stage 29. Generally speaking, a movable range of a piezoelectric element is defined from several micrometers to several tens of micrometers. The optical probe is scanned within a large range and a coarse movement is carried out by the x/y-stage 30, whereas a fine positioning is performed by the piezoelectric element 31. At this time, the positioning precision of the x/y-stage 30 must be entered within the movable range of the piezoelectric element 31. As will be described later, the system controller 25 measures an interval between the optical probe 11 and either a surface 7 of the glass substrate 6, or a sample (specimen) 9 positioned on this surface 7. The above-explained system controller 25 compares this measurement result and the instruction value issued from the computer 24, and supplies the currents to the z-stage 29 and the piezoelectric element 33 in order that an interval between the optical probe 11 and either the surface 7 of the glass substrate 6, or the sample 9 positioned on the surface 7 is coincident with the instruction value of the computer 24. Also, the computer 24 gives an instruction value to the system controller 25, so that the interval between the optical probe 11 and either the surface 7 of the glass substrate 6, or the sample 9 positioned on the surface 7 can be set to a predetermined value. The z-stage 29 transports a holding member 32 along the up/down directions of FIG. 1, whereas the piezoelectric element 33 transports a probe holding member 34 in relative to the holding member 32 along the up/down directions of FIG. 1. The optical probe 11 is fixed to a probe retaining member 34. At this time, it is also required that a coarse (rough) transportation is performed by the z-stage 29, a fine transportation is performed by the piezoelectric element 33, and positioning precision of the z-stage 29 is set within the movable range of the piezoelectric element 33.

As shown in FIG. 1 and FIG. 3, light irradiated from the semiconductor laser 1 passes through a Fabry-Pérot etalon 2 and then is incident upon a beam splitter 3. This semiconductor laser 1 contains a Peltier effect element, in which the temperature of the chip for irradiating the light is maintained constant, and the wavelength of the irradiated light is stabilized. Also, an isolator is mounted on the irradiating portion in order that the irradiated light is not returned to the chip for irradiating the light. Since the spectral width of the light irradiated from the semiconductor laser 1 is wide and the coherence length is short, this spectral width is narrowed and the coherence length is made long by the Fabry-Pérot etalon 2.

The light incident upon the beam splitter 3 is split into both measuring light to be irradiated to the sample, and reference light which is used to interfere with this measuring light. The measuring light is reflected by the mirrors 4 and 5 to be incident upon the glass substrate 6. This light is incident on the glass substrate 6 at such an angle that total reflection occurs at the surface 7 of this glass substrate 6. Then, as illustrated in FIG. 5, an evanescent wave 8 is generated on the surface 7. The sample 9 to be observed is mounted on a region on the surface 7 scanned by the optical probe 11. In this case, the sample 9 is assumed to be a transparent substance as a cell of biological object. However, it is also possible to measure such an optical component as a lens and the like as the sample 64, and such an optical element having a light waveguide path as the sample 93. Then, an evanescent wave 10 is also generated around the sample. These evanescent waves 8 and 10 are picked up or extracted from the optical probe 11.

The optical probe 11 has such a structure that single mode optical fibers 12, 13 and 14 are fused. A projection 17 is provided on a core of the optical fiber 13. A radius of curvature of a tip portion of the projection 17 is made sufficiently smaller than the wavelength of the light emitted from the semiconductor laser 1, say several nm to several tens nm. This portion is positioned close to either the surface 7, or the sample 9 by a distance from several nm to several tens of nm, so that the evanescent waves 8 and 10 can be selectively picked up from a narrow region near the tip portion 17.

As a consequence, resolution which is significantly smaller than the wavelength of the light emitted from the semiconductor laser 1 can be obtained. When Ge is dopped into the core 15 of the optical fiber 13 and F is dopped into a cladding 16, and the resultant is etched away by using a mixed solution of HF and $NH_4F$, such a projection 17 can be formed based on a difference in the etching rates of the core 15 and the cladding 16.

As represented in FIG. 1 and FIG. 3, the reference light separated by the beam splitter 3 is incident upon a beam splitter 20. A portion of this incident reference light is reflected by the beam splitter 20 and passes through a $\lambda/2$ plate 37, and then focused by a rod lens 19, so that the focused reference light is incident upon the optical fiber 14. The $\lambda/2$ plate 37 is rotatable around an optical axis. Since the light can be incident upon the optical fiber 14, the edge surface of the optical fiber 14 is positioned in high precision to the focal point of the rod lens 19 by the fiber holder 18.

The reference light incident upon the optical fiber 14 passes through a phase modulator 22, and then is incident onto the portion of the optical probe 11 shown in FIG. 2. Since the optical fiber 13 is optically coupled with the optical fiber 14, a portion of the reference light incident upon the optical probe 11 is transferred to the optical fiber 13 at a fusing portion 35 of FIG. 5. The light which has not been transferred to the optical fiber 13 is reflected at a reflection film 36 provided at the edge portion of the optical fiber 14. A portion of the reflected light is transferred to the optical fiber 13 at the fusing portion 35.

Both of the measuring light picked up at the projection 17, and the reference light transferred from the optical fiber 14 at the fusing portion 35 are propagated to the optical fiber 13. In case that the polarizing direction of the measuring light within the optical fiber 13 would be coincident with that of the reference light, this measuring light will interfere with the reference light. Therefore, the polarizing direction of the reference light within the optical fiber 13 is made coincident with that of the measuring light by adjusting or controlling the rotation angle of the $\lambda/2$ plate 37. As a result, the reference light may interfere with the measuring light.

Both the measuring light and the reference light present within the optical fiber 13 are collimated by the rod lens 38 shown in FIG. 1 and FIG. 2, and then are incident upon a diffraction grating 40. Both the reference light and the measuring light which have been incident upon the diffraction grating 40, are diffracted, and then are converted into electric signals by a photo detector 39. This signal is inputted via the system controller 25 into the computer 24 so as to be recorded therein. Since the reference light interferes with the measuring light, a phase difference between the reference light and the measuring light, and intensities thereof may be calculated from the electric signals outputted from the optical detector 39 when either the phase of the reference light is shifted by ±π/2, or this phase is not shifted. When the output power of the semiconductor laser 1 is selected to be on the order of mW, the power of the reference light propagated through the optical fiber 14 is also selected to be on the order of mW. However, the power of the light picked up from the projection 17 becomes such a small value on the order of pW. Considering now the dynamic range of the photo detector, it is preferable that the power of the reference light propagated through the optical fiber 13 is substantially equal to the power of the measuring light picked up from the projection 17. As a consequence, it is preferable that approximately 1/one billion of the reference light propagated through the optical fiber 14 is transferred to the optical fiber 13. It should be noted that since power of the light detected by the photo detector 39 is on the order of pW, namely very weak, such a specific measure should be taken that the output from the semiconductor laser 1 is modulated, and synchronous-detected by a lock-in amplifier in synchronism with the modulation of the semiconductor laser 1.

The reference light which has been reflected by the reflection film 36 of FIG. 5 and has not be transferred to the optical fiber 13 at the fusing portion 35, is propagated through the optical fiber 14, and then passes through the phase modulation element 22, the fiber holding member 18, the rod lens 19, and the λ/2 plate 37 shown in FIG. 3, and is again incident upon the beam splitter 20. A portion of the reference light returned to the beam splitter 20 is incident upon a photodetector 21. The reference light which has been split by the beam splitter 3, incident upon the beam splitter 20, and then passed through this beam splitter 20, is reflected by a reflection film 23 provided on an upper surface of this beam splitter 20, and furthermore is reflected by the beam splitter 20, so that the finally reflected reference light is incident upon the photo detector 21. In this photo detector (photodetector) 21, the light reflected by the reflection film 23 will interfere with the light reflected by the reflection film 36.

When the optical probe 11 is scanned over the surface 7 of the glass substrate 6, distortion is given to the optical fiber 14. In general, when distortion is given to an optical fiber, an effective refractive index under such a condition that light is propagated through this optical fiber, is varied. Thus, since the effective refractive index of the optical fiber 14 is also varied, an optical path is changed and the phase of the reference light transferred to the optical fiber 13 is changed. As a result, even when the optical probe 11 is scanned to measure the phase difference between the reference light and the measuring light, a phase distribution of the measuring light near the sample 9 could not be recognized. Thus, the reference light reflected on the reflection film 23 is caused to interfere with the reference light reflected on the reflection film 36 on the photo detector 21. The phase of the reference light reflected on the reflection film 36 and being incident upon the photo detector 21 will be shifted due to an adverse influence caused by the distortion given to the optical fiber 14. This phase shift may be recognized by checking the output from the photo detector 21.

In FIG. 4, there is shown a sectional view of a phase modulator 22. The phase modulator 22 is arranged by fiber fixing units 41, 43 and a piezoelectric element 42. The fiber fixing units 41 and 43 are fixed to the optical fiber 14, and distortion may be given to this optical fiber 14 by applying electric charge to the piezoelectric element 42. In the actual use, tension distortion is previously given to the optical fiber, and the strength of the tension distortion is controlled by applying electric charge to the piezoelectric element 42.

The system controller 25 supplies a current to the phase modulator 22 based upon the output derived from the photo detector 21 (this current supply is equivalent to a supply of electric charge, because the current is obtained by differentiating the electric charge with respect to time), thereby controlling the optical path of the optical fiber 14 in such a manner that the phase difference between the light reflected by the reflection film 23 and the light reflected by the reflection film 36 is kept constant. Furthermore, to specify the phase of the measured light based on the output of the photo detector 39, the system controller 25 causes the optical path of the optical fiber 14 to be changed from such a point that the phase difference is kept constant in such a manner that the phase of the reference light is varied by just +π/2 and −π/2 in response to the instruction issued from the computer 24. In synchronism with this control, the computer 24 stores, or records the outputs from the photo detector 39 generated when the phase of the reference light is shifted by just +π/2 and −π/2, and when the phase of the reference light is not shifted, respectively. As a consequence, the phase of the reference light transferred to the optical fiber 13 may be always set to the known value. Also, the computer 24 can calculates the intensity and the phase of the measured light from the output derived from the photo detector 39 when the phase of the reference light is not shifted, and the output derived from the photo detector 39 when the phase of the reference light is shifted by just −π/2 and +π/2. When the optical probe scans to calculate the phase difference between the reference light and the measured light, the phase distribution of the measured light near the sample 9 can be recognized.

The light irradiated from the semiconductor laser 26 shown in FIG. 1 and FIG. 2 is penetrated through the beam splitter 44, and then is incident upon the rod lens 46. This incident light is focused by the rod lens 46 and then coupled to the optical fiber 12. The light propagated through the optical fiber 12 is reflected at a terminal 47 of the optical fiber 12 shown in FIG. 5. The reflected light is propagated through the optical fiber 12 along another direction opposite to the above-described direction, again passes through the rod lens 46, and is reflected by the beam splitter 44, and the resultant light is detected by the photo detector 45. When the interval between the terminal 47 of the optical fiber 12 and either the surface 7, or the sample 9 is changed, reflectivity of the light at the terminal 47 of the optical fiber 12 is changed. This variation in reflectivity may cause a variation in the outputs derived from the photo detector 45, and therefore the interval between the optical probe 11 and either the surface 7 of the glass substrate 6, or the sample 9 can be obtained based upon the variation in the outputs of the photo detector 45.

As illustrated in FIG. 5, the optical probe 11 owns such a structure that the optical fibers 12, 13, 14 are fused. The thicknesses of the claddings of the optical fibers 12 and 13 are made thick in order that optical coupling does not occur between these optical fibers 12 and 13. However, to improve resolution and to be detectable evanescent wave, the interval between the optical probe 11 and either the surface 7 or the sample 9 must be considerably narrowed, e.g., several nm to several tens of nm. Also, it is required to control the interval between the optical fiber 11 and either the surface 7, or the sample 9 in precision of at least several nm in order that the projection 17 does not collide with either the surface 7, or the sample 9. Since a variation amount of this interval is small, the variation in reflectivity is also small. In this case, a similar measure must be taken such that the output from the semiconductor laser 26 is modulated, and the output from the photo detector 45 is synchronous-detected by the lock-in amplifier in synchronism with the modulation of the semiconductor 26. To obtain a signal at a better S/N ratio, the output power of the semiconductor laser 26 should be selected to be on the order of mW.

As illustrated in FIG. 5, the optical probe 11 owns such a structure that the optical fibers 12, 13, 14 are fused. The thicknesses of the claddings of the optical fibers 12 and 13 are made thick in order that optical coupling does not occur between these optical fibers 12 and 13. However, the power of the measured light picked up or extracted from the projection 17 is on the order of pW, and the intensity of the light propagated through the optical fiber 12 is on the order of mW. As a consequence, even when 1/one billion of the light propagated through the optical fiber 12 would be transferred to the optical fiber 13, a certain trouble would be made in the measurement of the measuring light. Therefore, while the wavelength of the semiconductor laser 1 is shifted from that of the semiconductor laser 26, the light which has been propagated through the optical fiber 13 is once incident upon the diffraction grating 40, and then the light irradiated from the semiconductor laser 1 is separated from the light irradiated from the semiconductor laser 26. In accordance with this manner, only the light emitted from the semiconductor laser 1 is detected by the photo detector 39.

As described above, the region near the sample 9 is scanned by the optical probe 11, and thus, the phase and intensity of the measuring light are measured and also the interval between the surface 7 of the glass substrate 6, or the sample 9 and the optical probe 11 is measured in synchronism with this scanning operation. The measured values are stored in the computer 24 and analyzed therein, so that the shape of the sample 9, the intensity distribution and also the phase distribution of the light around the sample 9 can be obtained. From the shape of the sample 9, and the intensity distribution and the phase distribution of the light around the sample, a distribution of refractive index inside the sample may be predicted. Since the data process is carried out by the computer, the measurement is performed in the discrete form. At this time, if a comparison is made between a phase measurement value at a certain point and another phase measurement value at the next point and a difference between the two phase measurement values is greater than, or equal to $\pi$, a phase relationship between these two measuring points would become unstable. To avoid such an unstable phase relationship, the interval between the measuring points under scanning operation may be made shorter than ½ wavelength of the light present in the region under scanning operation. In the first embodiment, assuming that the wavelength of the light irradiated from the semiconductor laser 1 under the vacuum condition is selected to be "$\lambda$", the refractive index of the glass substrate 6 is selected to be "n", and the incident angle with respect to the surface 7 is selected to be "$\theta$", the interval between the measurement points may be selected to be smaller than $\lambda/(2 \times n \times \sin \theta)$. However, although this interval may be made smaller than $\lambda/(2 \times n \times \sin \theta)$ as the phase measurement, the interval between the measurement points should be made narrower than the above-described interval for the shape or the dimension of sample 9.

Figure 6:
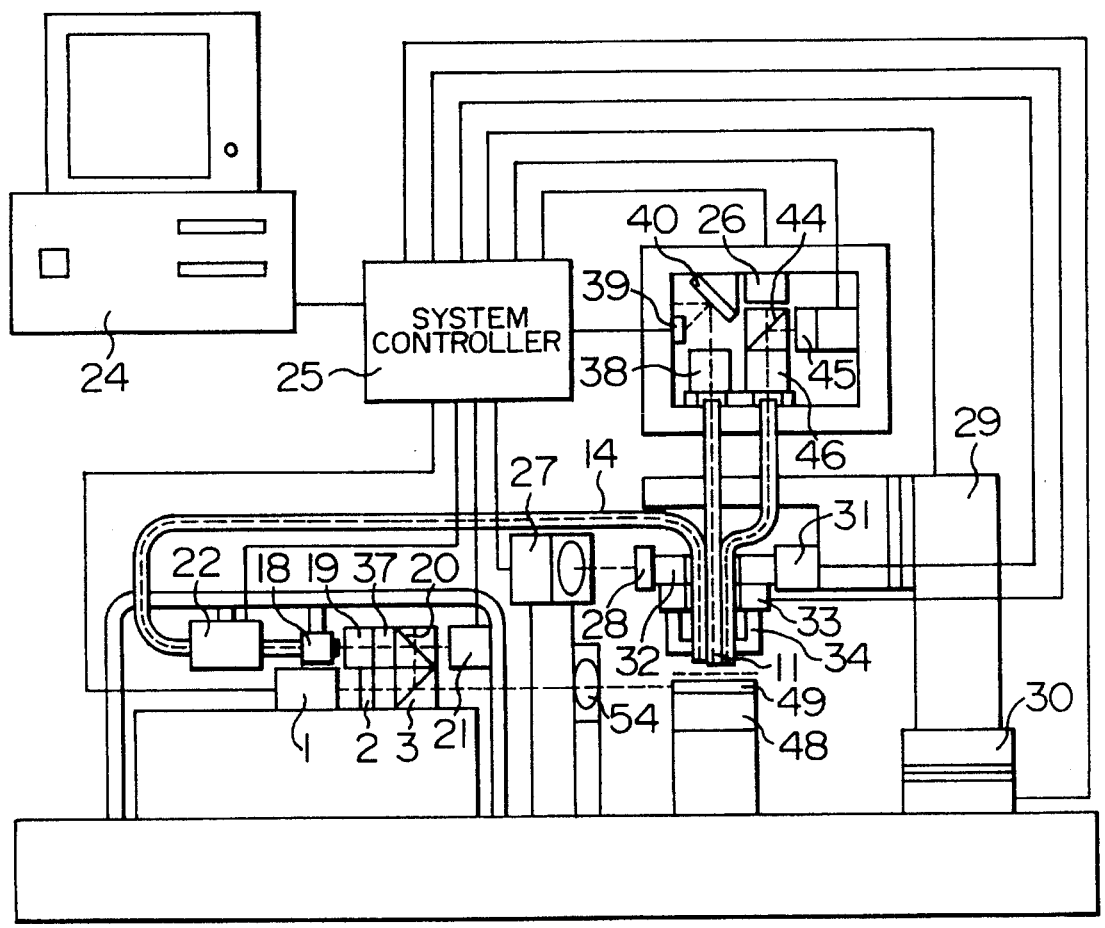
FIG. 6 schematically represents an optical system of an optical scanning type tunneling microscope according to a second embodiment of the present invention.
Figure 7:
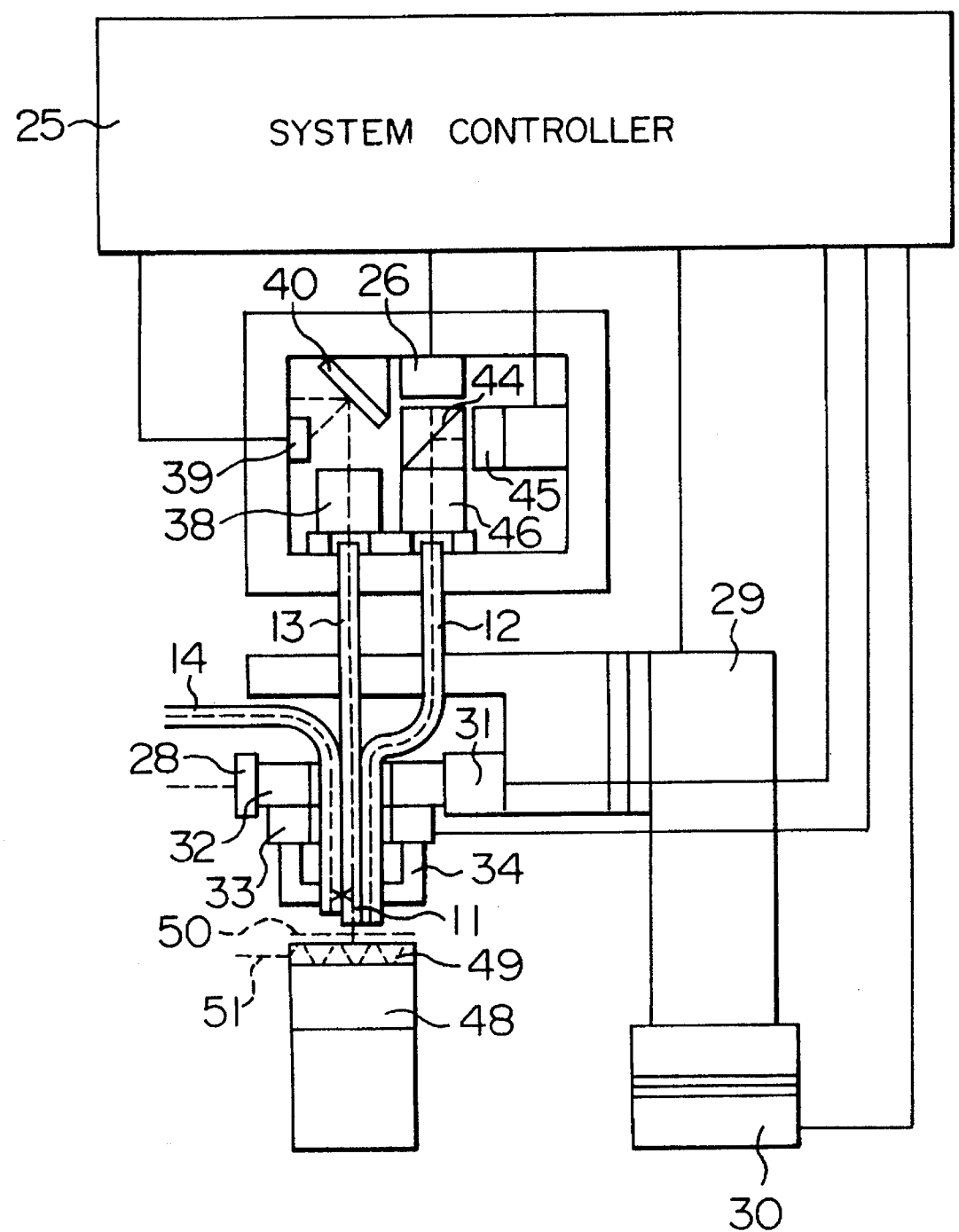
FIG. 7 is an enlarged view of an interferometer optical system employed in the tunneling microscope of FIG. 6.
Figure 8:
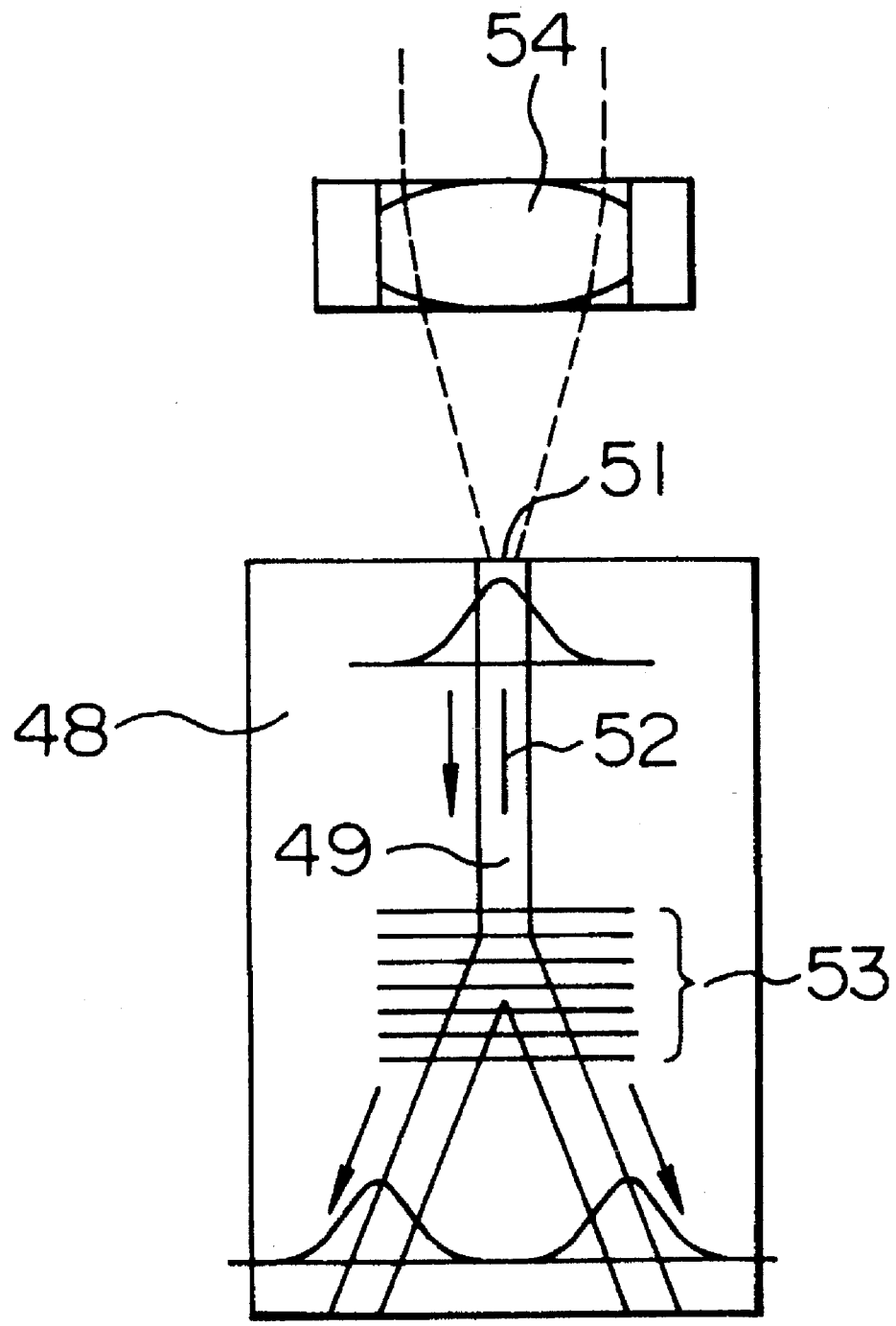
FIG. 8 is a plan view of a specimen used in the tunneling microscope of FIG. 6.

With reference to FIG. 6, FIG. 7 and FIG. 8, an optical scanning type tunneling microscope according to a second embodiment of the present invention will now be described. FIG. 6 schematically illustrates an optical system of the second optical scanning type tunneling microscope. FIG. 7 is an enlarged view for showing an interferometer optical system employed in this second tunneling microscope. FIG. 8 is a plan view of a sample used in this second tunneling microscope.

This second embodiment is identical to the first embodiment except that, as shown in FIG. 6 and FIG. 7, the sample 9 of the first embodiment is the very small object made of transparent substance whereas a sample 48 of the second embodiment is an optical element having an optical waveguide path 49, and the mirrors 4 and 5 are used to irradiate the measuring light to the sample in the first embodiment, whereas a lens 54 is employed so as to couple the measuring light from an edge surface 51 to the optical waveguide path 49 in the second embodiment.

In FIG. 8, there is shown a plan view of the sample 48. The optical waveguide path 49 is shaped as a Y branch. The light coupled from the edge surface 51 to the optical waveguide 49 is propagated downwardly as viewed in FIG. 8, and split into right and left directions of FIG. 8. At this time, an evanescent wave 50 is generated at a surface of this optical waveguide 49, and this evanescent wave 50 is picked up by the optical probe 11. In this case, the optical probe 11 is scanned along the light prorogation direction as shown in a line segment 52, and the wavelength of the light propagated through the optical waveguide path 49 can be measured by comparing the displacement amount of the optical probe 11 with the phase of the light picked up from the optical probe 11. The effective refractive index of the optical waveguide path 49 with respect to the light irradiated from the semiconductor laser 1 can be calculated by comparing the wavelength of the light propagated through the optical guide wave path 49 with the wavelength of the light irradiated from the semiconductor laser 1 under vacuum condition. When the branch portion indicated by a group 53 of line segments is scanned, an intensity distribution and a phase distribution at the branch portion can be recognized in detail by way of experiments. As to the interval between the measuring points, a similar care to that of the first embodiment should be taken.

In accordance with the second embodiment, it is assumed that the wavelength of the light irradiated from the semiconductor laser 1 under vacuum condition is selected to be "$\lambda$", and the effective refractive index of the optical waveguide path 94 is selected to be N, the interval between the measuring points may be made smaller than $\lambda/(2 \times N)$, only as to the phase measurement.

Next, a description will now be made of an optical scanning type tunneling microscope according to a third embodiment of the present invention with reference to FIG. 9 and FIG. 10.

Figure 9:
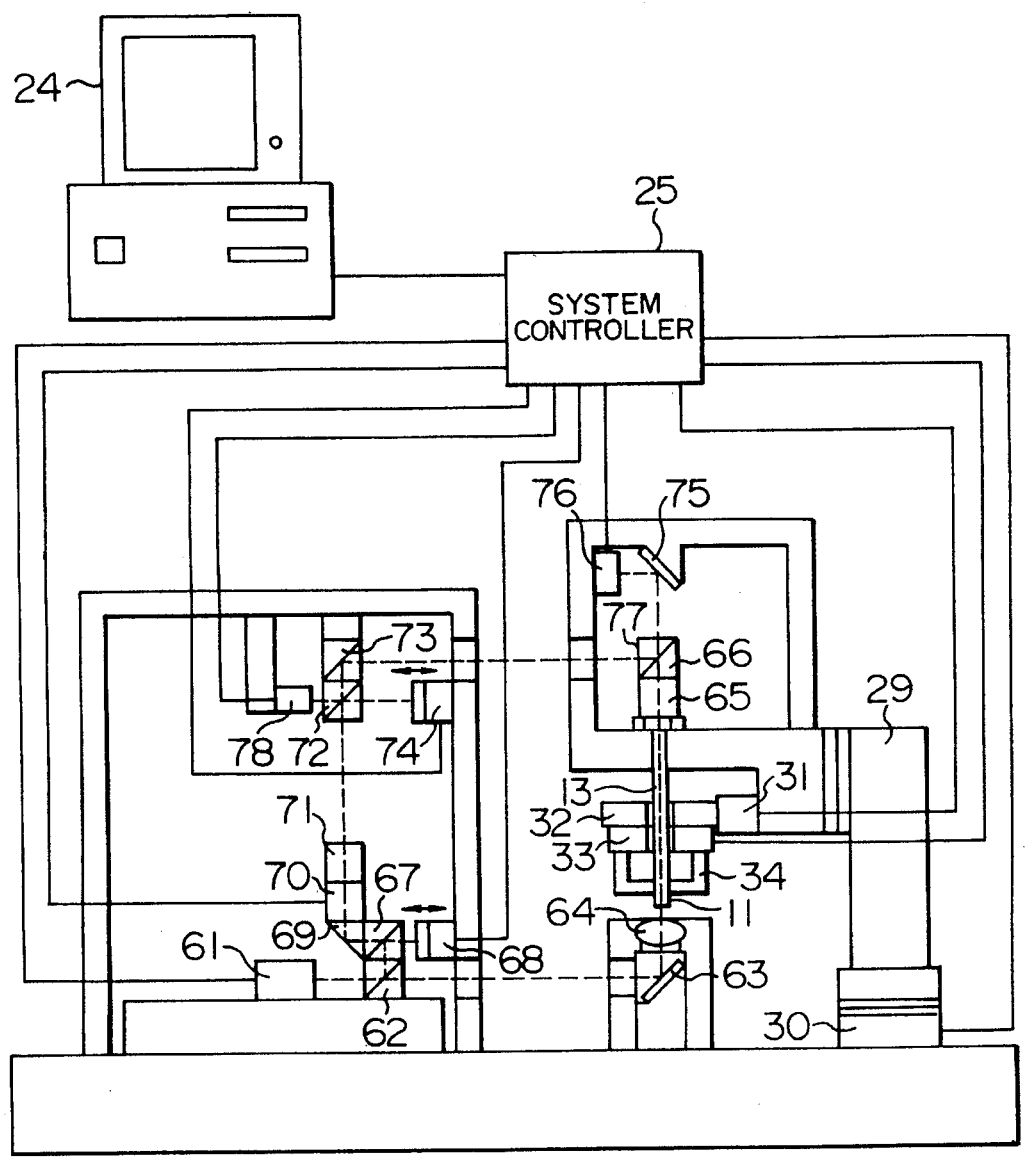
FIG. 9 schematically illustrates an optical system of an optical scanning type tunneling microscope according to a third embodiment of the present invention.

FIG. 9 is a schematic diagram of an optical system employed in the third optical scanning type tunneling microscope. FIG. 10 is an enlarged sectional view of a tip portion of an optical probe employed in the third optical scanning type tunneling microscope.

As represented in FIG. 9, the system controller 25 supplies currents to the x/y-stage 30 and the piezoelectric element 31 in response to the instruction issued from the computer 24 in order that a predetermined region of a surface of a sample 64 is scanned by the optical probe 11.

The x/y-stage 30 causes the z-stage 29 to be moved within the plane perpendicular to the drawing plane of FIG. 9 and along the horizontal direction of FIG. 9. The piezoelectric element 31 relatively moves a holder 32 within the same plane as the x/y-stage 30 with respect to the z-stage 29. Generally speaking, a movable range of a piezoelectric is defined from several micrometers to several tens of micrometers. The optical probe is scanned within a large range and a rough movement is carried out by the x/y-stage 30, whereas a fine positioning is performed by the piezoelectric element 31. At this time, the positioning precision of the x/y-stage 30 must be entered within the movable range of the piezoelectric element 31. As will be described later, the system controller 25 measures an interval between the optical probe 11 and a sample (specimen) 64.

The system controller 25 compares this measurement result with the instruction value issued from the computer 24, and supplies the currents to the z-stage 29 and the piezoelectric element 33 in order that an interval between the optical probe 11 and the sample 64 is coincident with the instruction value of the computer 24. Also, the computer 24 gives an instruction value to the system controller 25, so that the interval between the optical probe 11 and the sample 64 can be set to a predetermined value.

The z-stage 29 transports a holder 32 along the up/down directions of FIG. 9, whereas the piezoelectric element 33 transports a probe holding member 34 in relative to the holding member 32 along the up/down directions of FIG. 9. At this time, it is also required that a coarse (rough) transportation is performed by the z-stage 29, a fine transportation is performed by the piezoelectric element 33, and positioning precision of the z-stage 29 is set within the movable range of the piezoelectric element 33.

As shown in FIG. 9, light irradiated from a laser light source 61 is incident upon a beam splitter 62. The light incident upon the beam splitter 62 is separated into the measuring light which will be irradiated to the sample and the reference light which will interfere with this measuring light. The measuring light is reflected by the mirror 63 and then irradiated toward the sample 64 (in this embodiment, an optical component such as a lens is used as this sample 64. However, as previously explained, it is possible to measure such a very small object as a cell of a biological object made of a transparent substance, or an optical element having an optical waveguide path as a sample 93, as will be described later). The transmitting light (reflected light, depending upon a slight change in its position), the scattered light, or the evanescent wave generated from the sample 64 by irradiating the measuring light to this sample 64, is picked up from the optical probe 11.

Figure 10:
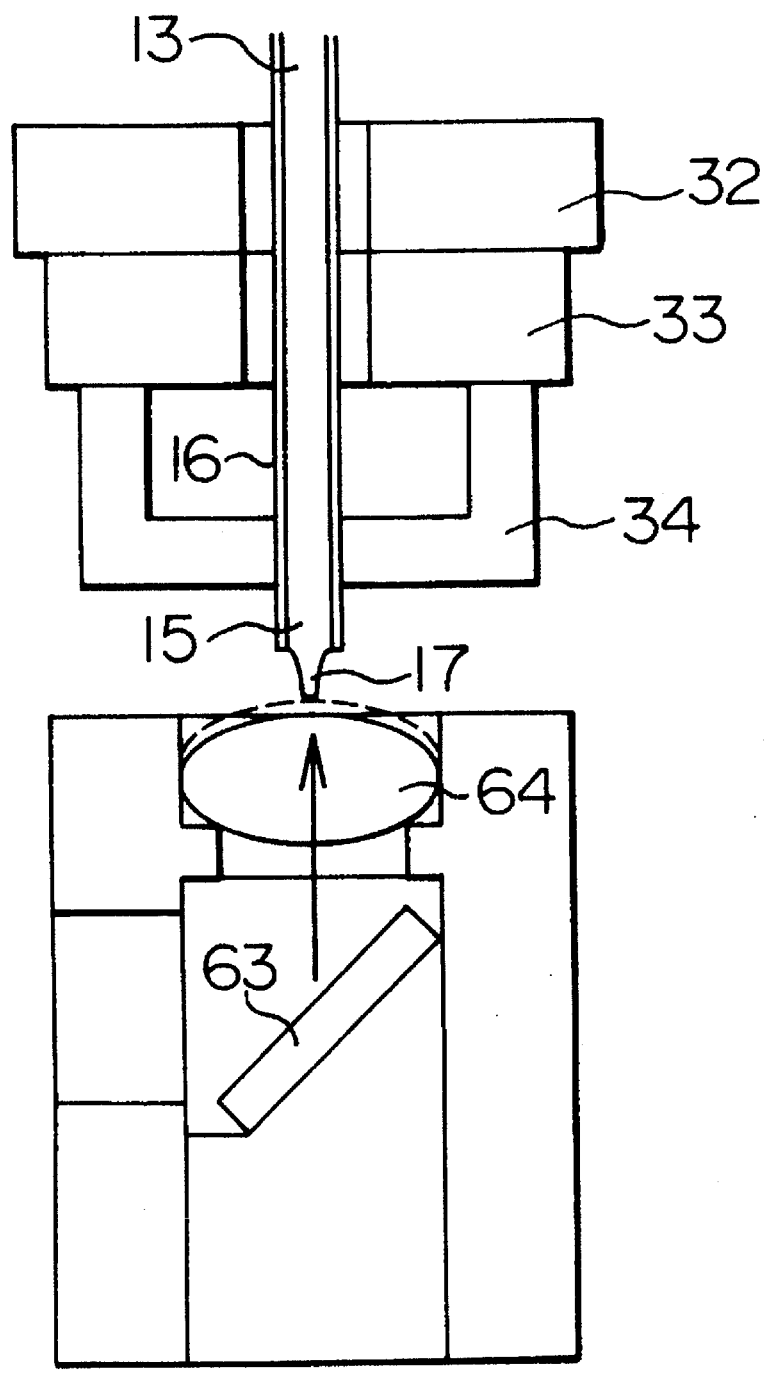
FIG. 10 is an enlarged sectional view for showing a tip portion of an optical probe and a peripheral portion thereof employed in the tunneling microscope of FIG. 9.

As represented in FIG. 10, the optical probe 11 has such a structure that a projection 17 is formed at a core portion of the optical fiber 13. A radius of curvature of a tip portion of the projection 17 is smaller than the wavelength of the light emitted from the laser light source 61, and is selected to be values defined from several nm to several tens of nm. Since this portion is located close to the sample 64 by distances from several nm to several tens of nm, the transmitted light, the scattered light, or the evanescent wave generated from the sample 64 may be selectively picked up or extracted from a narrow region near the projection 17. As a consequence, it is possible to obtain sufficiently small resolution, as compared with the wavelength of the light emitted from the laser light source 61. The measuring light picked up from the optical probe 11 is propagated through the optical fiber 13, and is collimated by the rod lens 65, and the collimated measuring light is incident upon the beam splitter 66.

As indicated in FIG. 9, the reference light separated by the beam splitter 62 is incident upon the beam splitter 67. A portion of this incident light is reflected by the beam splitter 67 and furthermore reflected by a movable mirror 68. The system controller 25 supplies the current to the movable mirror 68, whereby the surface of the movable mirror 68 from which the light is reflected can be moved along the vertical direction of this surface. As a consequence, the optical path through which the reference light is propagated may be varied.

A portion of the reference light which has been reflected by the movable mirror 68 and has been again incident upon the beam splitter 62, passes through the beam splitter 62, and reflected by a reflection prism 69, and then is incident upon a light intensity modulator 70. The system controller 25 supplies a current to the light intensity modulator 70, so that the intensity of the light passing through this modulator 70 can be modulated. The reference light transmitted through the light intensity modulator 70 is penetrated through the $\lambda/2$ plate 71 and the beam splitter 72, and is reflected by the reflection prism 73, and thereafter is incident upon the beam splitter 66.

Both the measuring light and the reference light, which have been incident upon the beam splitter 66 are reflected by the mirror 75, and are converted into electric signal by the photo detector 76. These signals are inputted via system controller 25 to the computer 24 for storage purposes.

In such a case that the polarizing direction of the measuring light is coincident with that of the reference light, and both of the measuring light and the reference light are incident on the photo detector 76, the measuring light will interfere with the reference light. This, the polarizing direction of the reference light is made coincident with the polarizing direction of the measuring light by adjusting the rotation angle of the $\lambda/2$ plate 71. As a consequence, the reference light can interfere with the measuring light.

In case that the reference light interferes with the measuring light, a phase difference between the reference light and the measuring light, and intensities thereof may be calculated from the electric signals outputted from the optical detector 76 when either the phase of the reference light is shifted by $\pm\lambda/2$, or this phase is not shifted.

When the output power of the laser light source 61 is selected to be on the order of mW, the power of the reference light incident upon the beam splitter 66 is also selected to be on the order of mW. However, the power of the light picked up from the projection 17 becomes such a small value on the order of pW.

Considering now the dynamic range of the photo detector, it is preferable that the power of the reference light reflected by the beam splitter 66 is substantially equal to the power of the measuring light pick up from the projection 17. As a consequence, a reflection film 77 is provided at the plane upon which the reference light of the beam splitter 66 is incident, so that most of this incident light is reflected and then the transmittance is reduced by 1/one billion. It should be noted that since power of the light detected by the photo detector 39 is on the order of pW, namely very weak, such a specific measure should be taken that the output from the laser light source 61 is modulated, or the intensity of the light or the intensity of the light passing through the light intensity modulator 70 is modulated and synchronous-detected by a lock-in amplifier in synchronism with the modulation of the laser light source 61.

A portion of the reference light reflected at the reflection film 77 is reflected by the reflection prism 73, and reflected by the beam splitter 72, and then is incident upon the photo detector 78. Another portion of the reference light which has not transmitted through the beam splitter 72 among the reference light which has passed through the λ/2 plate 71 and has been incident upon the beam splitter 72, is reflected by this beam splitter 72, and furthermore reflected by the movable mirror 74.

The system controller 25 can move the plane of the movable mirror 74 for reflecting the light along the vertical direction by supplying the current to the movable mirror 74. The reference light reflected at the movable mirror 74 passes through the beam splitter 72 and then is incident upon the photo detector 78. Here, the reference light reflected by the movable mirror 74 will interfere with the reference light reflected by the reflection film 77.

In general, when the optical probe 11 is scanned, the interval between the reflection prism 73 and the reflection film 77 is varied. As a result, the optical path of the reference light would be changed. Accordingly, even when the optical probe 11 is scanned to measure the phase difference between the reference light and the measuring light, the phase distribution of the measuring light located near the sample 64 cannot be grasped. Under such a circumstance, the reference light reflected by the reflection film 77 will interfere with the reference light reflected by the movable mirror 74 on the photo detector 78. Also in this case, the phase of any one of the two sets of reference light (this light is called 1st reference light) which will interfere with each other, is shifted by $+\pi/2$ and $-\pi/2$ from the reference phase. Then, the phase of the other reference light (this light is called 2nd reference light) whose phase is not shifted can be specified based upon the output derived from the photo detector 78 when the 1st reference light has the reference phase, and also the output derived from the photo detector 78 when the phase of the 1st reference light is shifted by $+\pi/2$ and $-\pi/2$.

At a time instant when the optical probe 11 reaches a point where a phase and an intensity of laser light within a region to be scanned are wanted to be measured, the system controller 25 supplies the current to the movable mirror 74 in response to the instruction issued from the computer 24, whereby the phase of the reflected light from the movable mirror 74 is shifted by $+\pi/2$ and $-\pi/2$ from the reference phase. The output from the photo detector 78 is stored via the system controller 25 into the computer 24 in synchronism with this phase variation. From this stored data, the phase of the reference light reflected from the reflection film 77 may be detected. Furthermore, when the outputs derived from the photo detector 78 are monitored while the optical probe 11 is scanned, and the number of light/dark fringe is counted, the phase of the reference light incident upon the beam splitter 66 may be detected. At a time instant when the optical probe 11 reaches a point where a phase and an intensity of laser light within a region to be scanned are wanted to be measured, the system controller 25 supplies the current to the movable mirror 68 in response to the instruction issued from the computer 24, whereby the phase of the reflected light from the movable mirror 68 is shifted by $+\pi/2$ and $-\pi/2$ from the reference phase. The output from the photo detector 76 is stored via the system controller 25 into the computer 24 in synchronism with this phase variation. From this stored data, the phase difference between the reference light and the measuring light, which are entered into the beam splitter 66, and also the intensity of the reference light and the measuring light can be obtained. Even when the movable mirror 68 is moved, neither adverse influence is given to the output from the photo detector 78, nor adverse influence is given to the measurement result of the phase change in the reference light incident upon the beam splitter 66, which caused by a change in the distances between the reflection prism 73 and the reflection film 77. As described above, the phase of the transmitted light, the scattered light, or the evanescent wave picked up by the optical probe 11 from the adjoining area of the surface of the sample 64 based upon the phase of the reference light incident upon the beam splitter 66, and the phase difference between the reference light and the measuring light, detected by the photo detector 76.

When the reference light would be interrupted by the light intensity modulator 71, this optical scanning type tunneling microscope according to the present invention will be operated same as the normal (conventional) optical scanning type tunneling microscope, so that the output of the photo detector 76 will depend upon the interval between the projection 17 and the sample 64. As a consequence, the interval between the projection 17 and the sample 64 can be measured by checking the output from the photo detector 76 under such a condition that the reference light is interrupted by the light intensity modulator 71. It should be noted that this interval measurement between the projection 17 and the sample 64 effected in accordance with the above-described method may be realized only when the intensity of the transmitted light (otherwise, reflection light if the arrangement is slightly changed), the scattered light, or the evanescent wave generated near the sample 64 is substantially constant in the region where the optical probe 11 is scanned, or operated.

The optical probe 11 is scanned in a predetermined region of the sample 64 under such a condition that the reference light is interrupted by the light intensity modulator 71, and the intervals between the projection 17 and the sample 64 during this scanning operation are stored into the computer 24. At a time instant when the optical probe 11 reaches at a point where the phase and the intensity of the measuring light are wanted to be measured, the reference light is penetrated by the light intensity modulator 71, so that the phase and the intensity of the measuring light are measured. This measurement result is stored into the computer 24 and then analyzed to obtain the shape of the sample 64, the intensity distribution of the peripheral light, and the phase distribution thereof. Furthermore, a distribution of internal refractive index is predictable based upon the shape of the sample 64, and the intensity/phase distributions of the peripheral light. As to the internal between the measuring points, a similar to that of mentioned in the first embodiment should be taken. In the third embodiment, assuming that the wavelength of the light emitted from the laser light source 61 under vacuum condition is selected by be λ, and the refractive index of the sample 64 is selected to be "n", the interval between the measuring points may be selected to be shorter than $\lambda/(2 \times n)$ approximately only as to the phase measurement, resulting in the sufficient precision.

Referring now to FIG. 11 to FIG. 14, an optical scanning type tunneling microscope according to a fourth embodiment of the present invention will be described.

Figure 11:
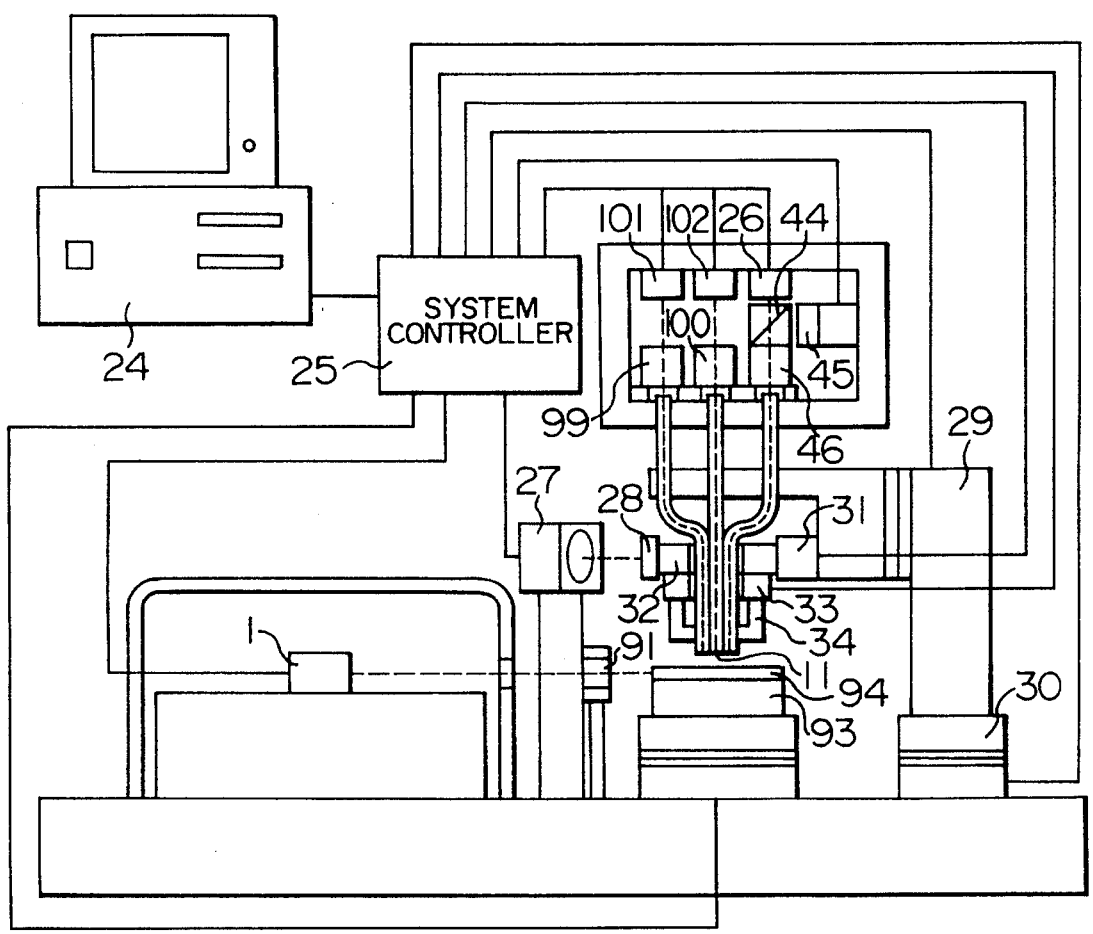
FIG. 11 schematically indicates an optical system of an optical scanning type tunneling microscope according to a fourth embodiment of the present invention.
Figure 12:
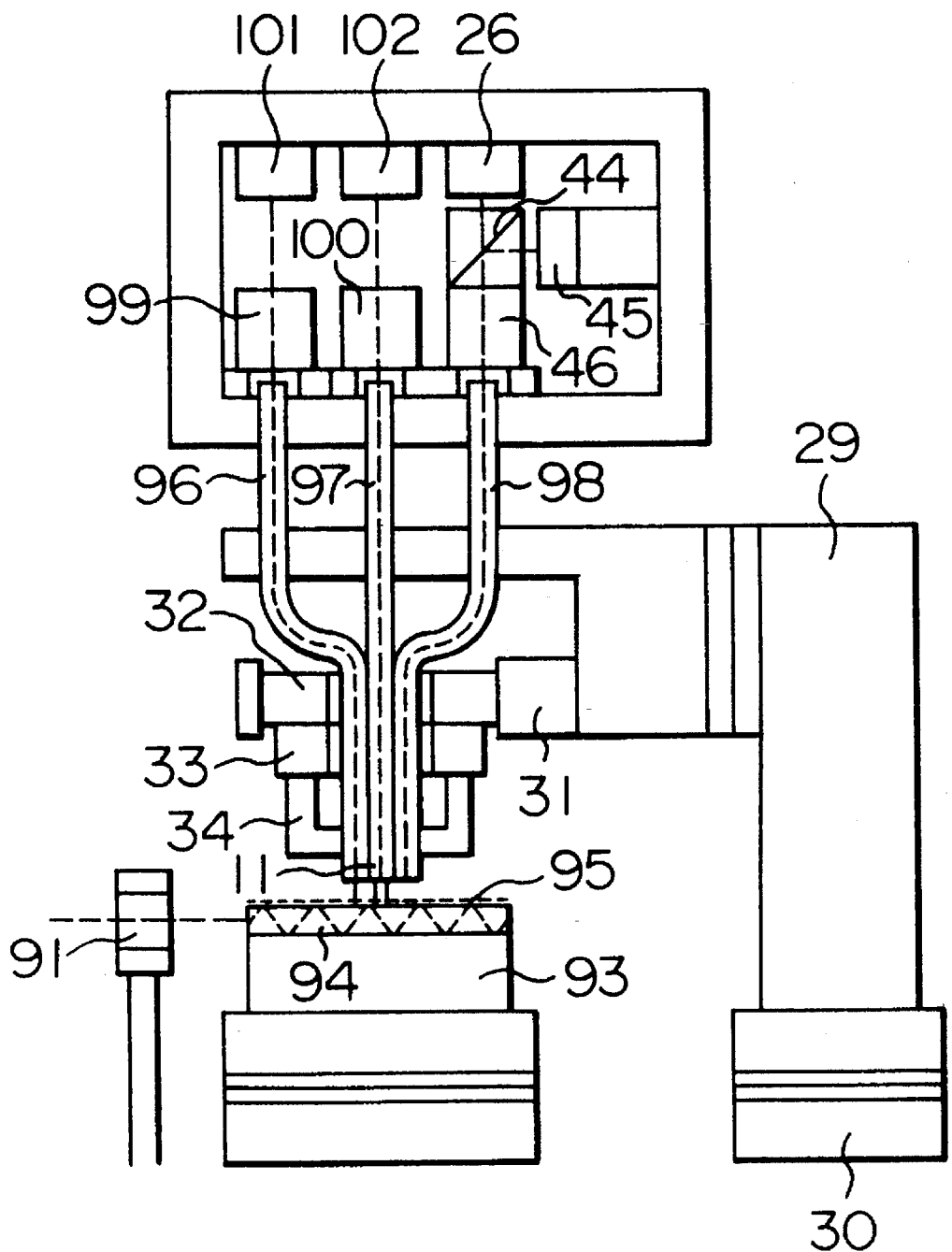
FIG. 12 is an enlarged view of an interferometer system employed in the optical scanning type tunneling microscope shown in FIG. 11.
Figure 13:
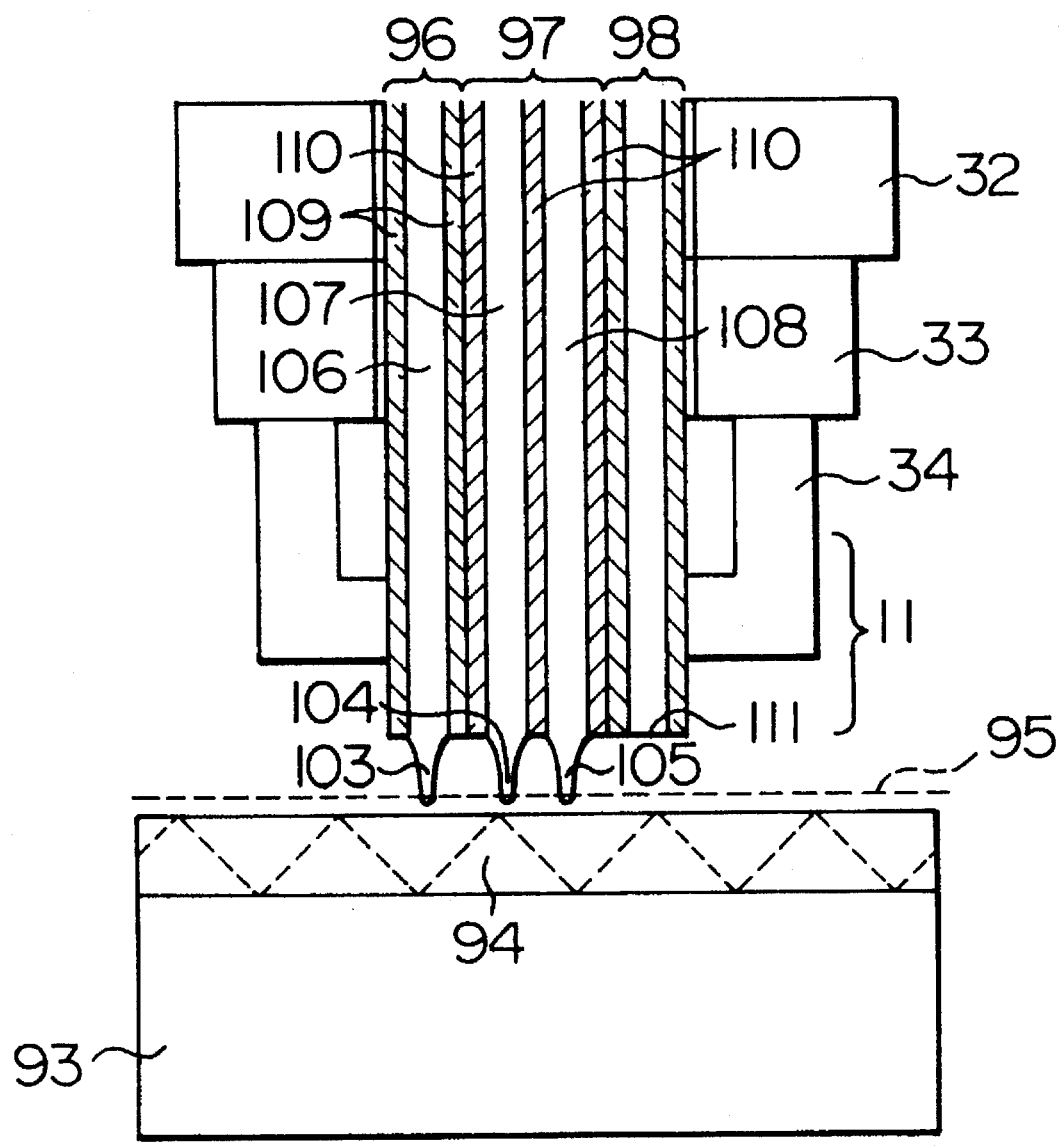
FIG. 13 is an enlarged view for showing an optical probe and a peripheral portion thereof employed in the tunneling microscope of FIG. 11.
Figure 14:
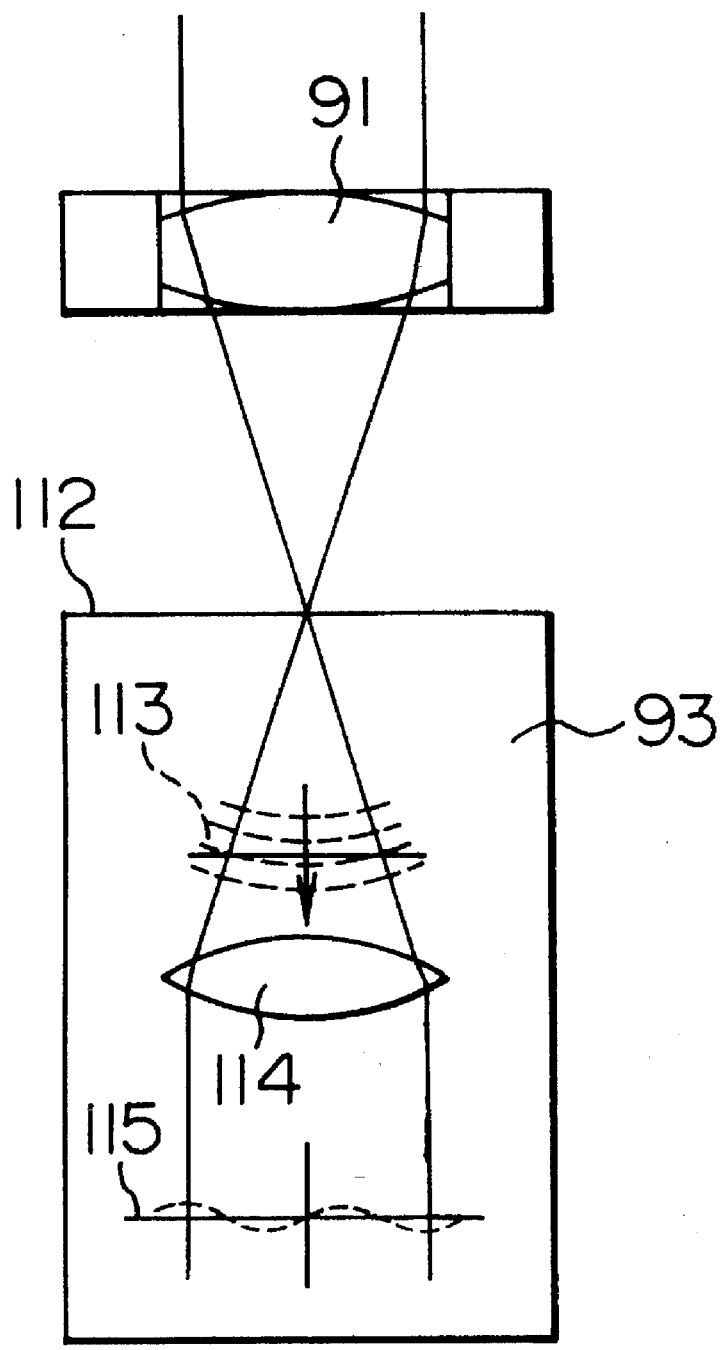
FIG. 14 is a plan view of a sample used in the tunneling microscope of FIG. 11.

FIG. 11 schematically shows an optical system employed in this fourth optical scanning type tunneling microscope. FIG. 12 is an enlarged view for showing an interferometer optical system employed in the fourth tunneling microscope. FIG. 13 is an enlarged sectional view of a tip portion of an optical probe employed in the fourth tunneling microscope. FIG. 14 is a plan view of a sample to be measured in the fourth tunneling microscope. It should be understood that operations of the laser interferometer 27, the mirror 28, the z-stage 29, the x/y-stage 30, the piezoelectric elements 31, 33, the holding member 32, and the probe holder 34 are the same as those of the above-explained first embodiment.

As illustrated in FIG. 11 and FIG. 12, light irradiated from the semiconductor laser 1 is focused by the lens 91, and then the focused light is coupled to an optical waveguide path 94 provided on the sample 93 from en edge surface thereof. This light is propagated through the optical waveguide path 94, and thus an evanescent wave 95 is generated from a surface of the sample 93 as shown in FIG. 13. In this case, it is assumed that an optical element having a light waveguide as this sample 93. However, it is also possible to measure such an optical component as a lens and the like as the sample 64, and such a very small object of a cell of a biological object. This evanescent wave 95 is picked up from the optical probe 11.

The optical probe 11 has such a structure that three optical fibers 96, 97, 98 optically separated from each other are fused. Each of the optical fibers 96 and 98 owns a single core, whereas the optical fiber 97 owns two cores 107 and 108. The core 106 of the optical fiber 96, and the cores 107, 108 of the optical fiber 97 are provided with projections 103, 104, 105, respectively. A radius of curvature of a tip portion of the respective projections 103 and 104 is made sufficiently smaller than the wavelength of the light emitted from the semiconductor laser 1, say several nm to several tens of nm. This portion is positioned close to the optical waveguide path 94 by a distance from several nm to several tens of nm, so that the evanescent wave 95 can be selectively picked up from a narrow region near the projections 103, 104, 105. As a consequence, resolution which is significantly smaller than the wavelength of the light emitted from the semiconductor laser 1 can be obtained. Such a projection may be fabricated in the similar manner to that of the first embodiment.

The light derived from the projection 103 is transmitted to the optical fiber 96, and then is collimated by a rod lens 99. The collimated light is incident upon the photo detector 101 to be converted into an electric signal. This electric signal is stored via the system controller 25 to the computer 24. The intensity of the evanescent wave generated around the projection 103 can be obtained from this stored signal.

Both of the light picked up from the projection 104 and the light derived from the projection 105 are propagated through the optical fiber 97, and will interfere with each other. Both of the two sets of above-described lights are collimated by a rod lens 100, and then are incident upon a photo detector 102 so as to be converted into an electric signal. Similarly, this signal is stored via the system controller 25 to the computer 24. In case that these projections 103, 104, 105 are located adjacent to each other, the intensity of the light picked up from the respective projections 103, 104, and 105 is substantially equal to each other. In this case, since the intensity of the evanescent wave near the projection may be detected by the signal outputted from the photo detector 101, a phase difference between the light picked up from the projection 104 and the light picked up from the projection 105 may be obtained based upon the outputs from the photo detectors 101 and 102. In other words, a phase difference between evanescent waves generated near the projections 104 and 105 may be calculated.

When the phase difference between the evanescent waves generated near the projections 104 and 105 would exceed "$\pi$", the phase difference between the evanescent waves generated near the projections 104 and 105 would become unstable. As a consequence, it is required in accordance with this fourth embodiment that the interval between the projections 104 and 105 is selected to be smaller than $\lambda/(2 \times N)$, assuming now that the wavelength of the light irradiated from the semiconductor laser 1 under vacuum condition is selected to be "$\lambda$" and the effective refractive index of the optical waveguide path 94 is selected to be "N". Under such a condition that the interval between the projections 104 and 105 is short, this phase difference may be recognized as a direction differential of phase with respect to a direction connecting the projection 104 with the projection 105. Since the interval between the projections 104 and 105 is sufficiently shorter than a sufficient coherent distance of the normal semiconductor laser, the coherent distance is no longer made longer even when the normal semiconductor laser is employed, as in the first embodiment such that the bandwidth is narrowed by employing such an element as Fabry-Pérot interferometer etalon. As a result, it is possible to irradiate light with strong intensity to the sample, as compared with the first embodiment.

The light emitted from the semiconductor laser 26 passes through the beam splitter 44, and then is incident upon the rod lens 46. This incident light is focused by the rod lens 46 and coupled to the optical fiber 98. The light propagated through the optical fiber 98 is reflected at a terminal 111 of the optical fiber 98. The reflected light is propagated through the optical fiber 98 along a direction opposite to the above-described direction, and again passes through the rod lens 46. Then, this light is reflected by the beam splitter 44 and is detected by the photo detector 45. When an interval between the terminal 111 of the optical fiber 98 and the sample 93 would be varied, reflectivity of the light at the terminal 111 of the optical fiber 98 would be changed. Thus variation in reflectivity will cause a change in the outputs derived from the photo detector 45, so that the interval between the optical probe 11 and the sample 93 can be obtained from this variation.

As described in the above manner, a preselected region of the sample 93 is scanned by the optical probe 11, the phase difference and the intensity of the evanescent waves are measured, and also the interval between the optical probe 11 and the sample 93 is measured in synchronism with the scanning operation by the optical probe 11. The measurement results are recorded in the computer 24 and analyzed to obtain the shape of the sample 93 as well as the intensity distribution and the phase distribution of the peripheral light. An internal refractive index distribution may be predicted based upon the shape of the sample 93, and the intensity/phase distribution of the peripheral light.

In FIG. 14, there is shown a plan view of the sample 93. The light focused by the lens 91 is coupled to the optical waveguide path 94 of FIG. 9 from the edge portion 112 of the sample 93. FIG. 14 represents such a condition that the light confined within the optical waveguide path 94 is collimated by a mode index lens 114 formed on the optical waveguide path 94. The direction of the line segment 113 is made coincident with the direction of the straight line to connect the projection 104 with the projection 105, and then the optical probe 11 is scanned over the line segment 113. As a result, the direction differentiation of the phase with respect to the direction of the line segment 113 may be obtained. The resultant differential data are integrated, so that the phase distribution over the line segment 113 can be obtained. An co-phasal line of the waveguide located near the line segment 113 can be obtained from this phase distribution. Similar to a line segment 115, a phase distribution over the line segment 115 and an co-phasal line located near the line segment 115 can be obtained. The characteristic of the mode index lens 114 can be evaluated by comparing the phase distribution over the line segment 113 with the phase distribution over the line 115. A similar care to that of the first embodiment should be taken as to the interval between the measuring points. In the fourth embodiment, assuming now that the wavelength of the light emitted from the semiconductor laser 1 under vacuum condition is selected to be "λ", and the effective refractive index of the waveguide path 94 is selected to be N, the interval between the measuring points may be selected to be smaller than λ/(2×N) only as to the phase measurement.

Referring now to FIG. 15 to FIG. 20, an optical scanning type tunneling microscope according to a fifth embodiment of the present invention will be described.

Figure 15:
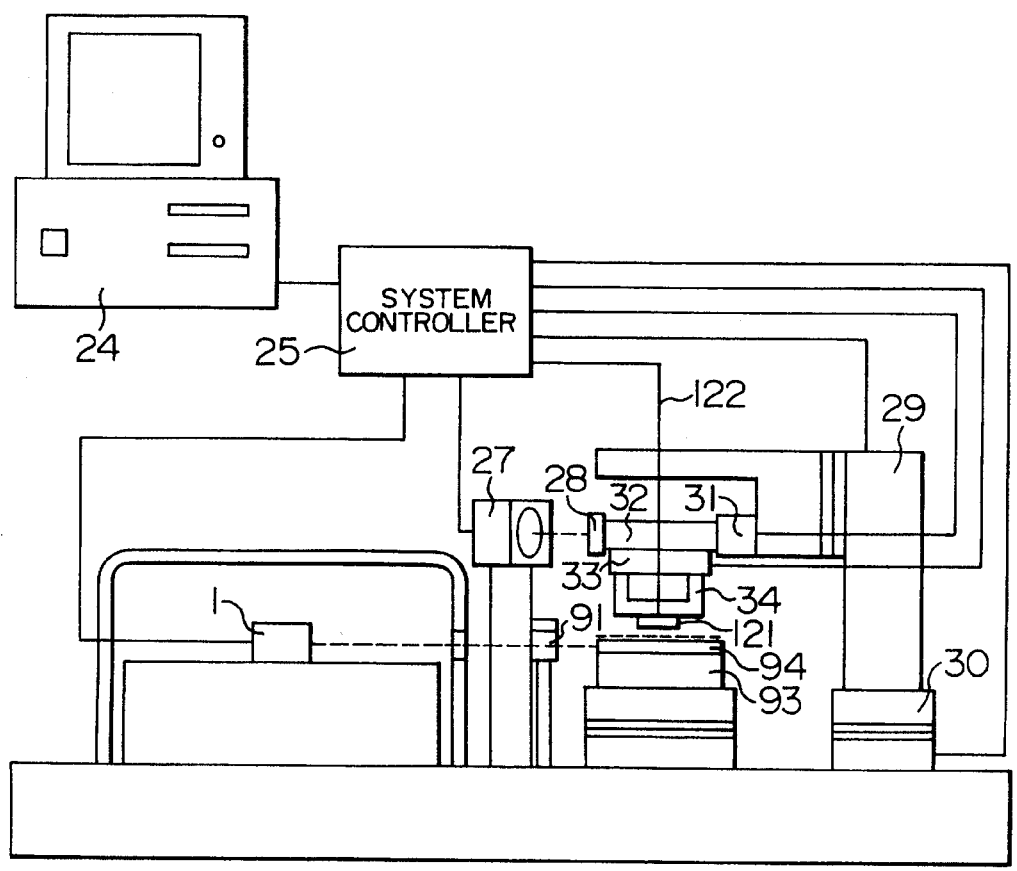
FIG. 15 schematically shows an optical system of an optical scanning type tunneling microscope according to a fifth embodiment of the present invention.
Figure 16:
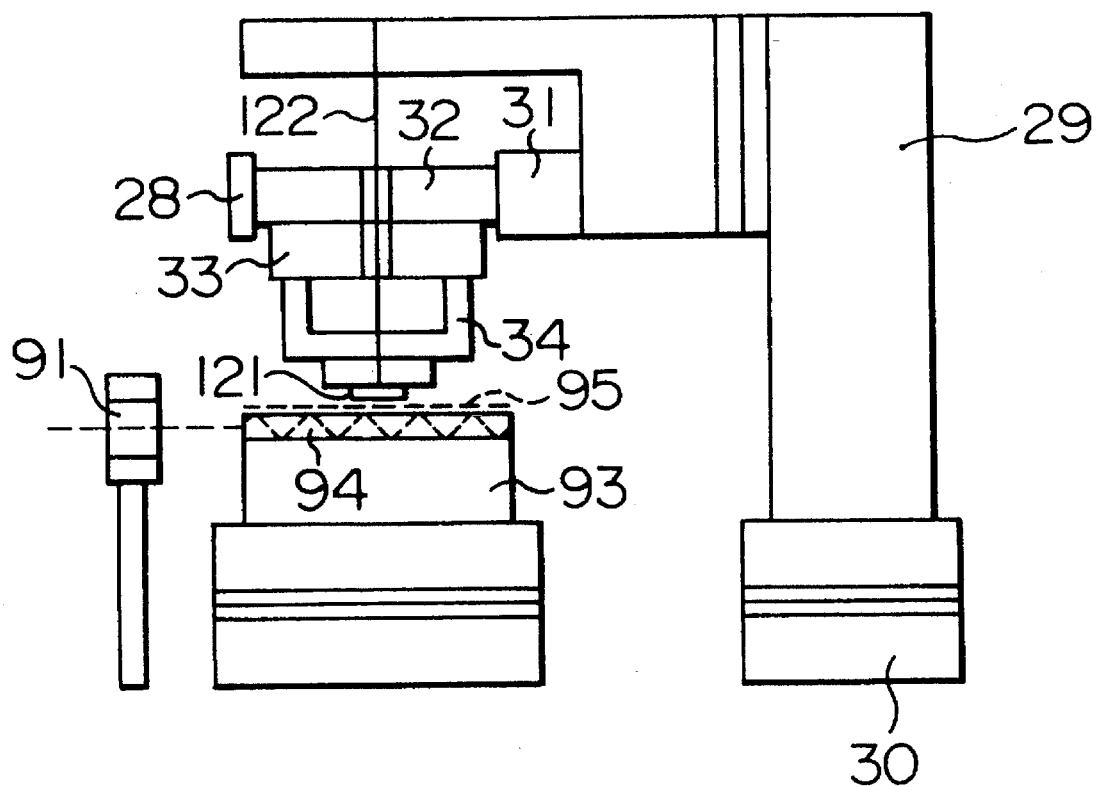
FIG. 16 is an enlarged view of the optical system of the tunneling microscope indicated in FIG. 15.
Figure 17:
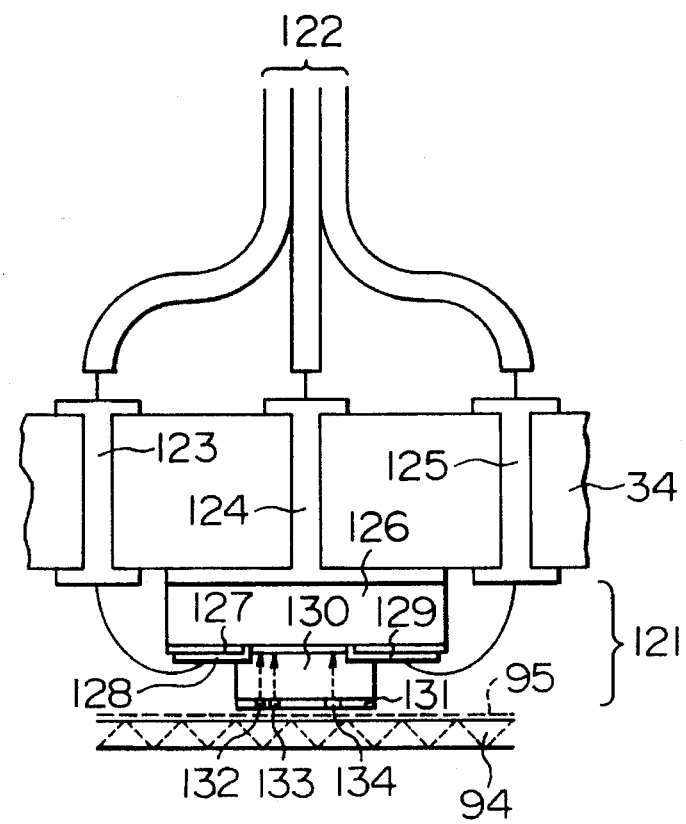
FIG. 17 is an enlarged view of an optical probe holding unit employed in the tunneling microscope of FIG. 15.
Figure 18:
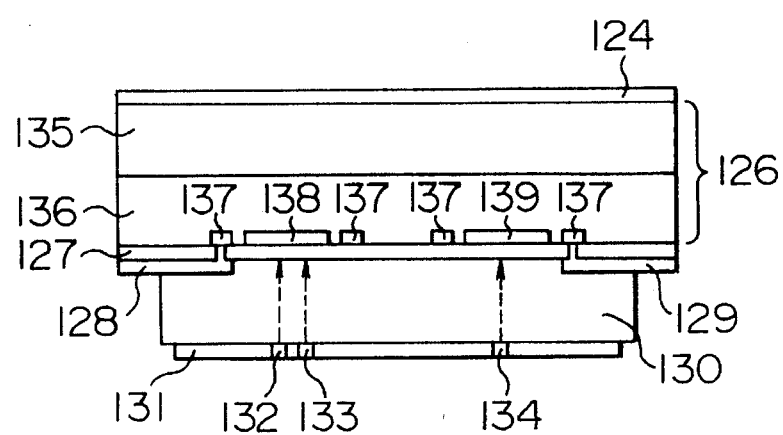
FIG. 18 is a sectional view for indicating the optical probe used in the tunneling microscope of FIG. 15.
Figure 19:
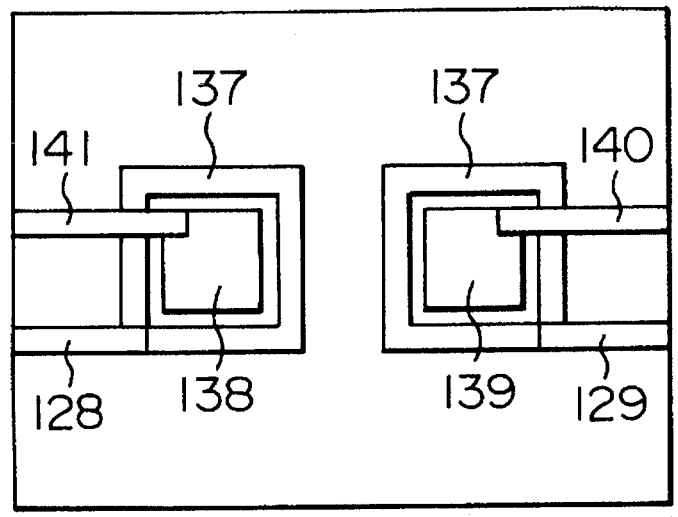
FIG. 19 is a plan view for indicating the optical probe used in the tunneling microscope of FIG. 15.
Figure 20:
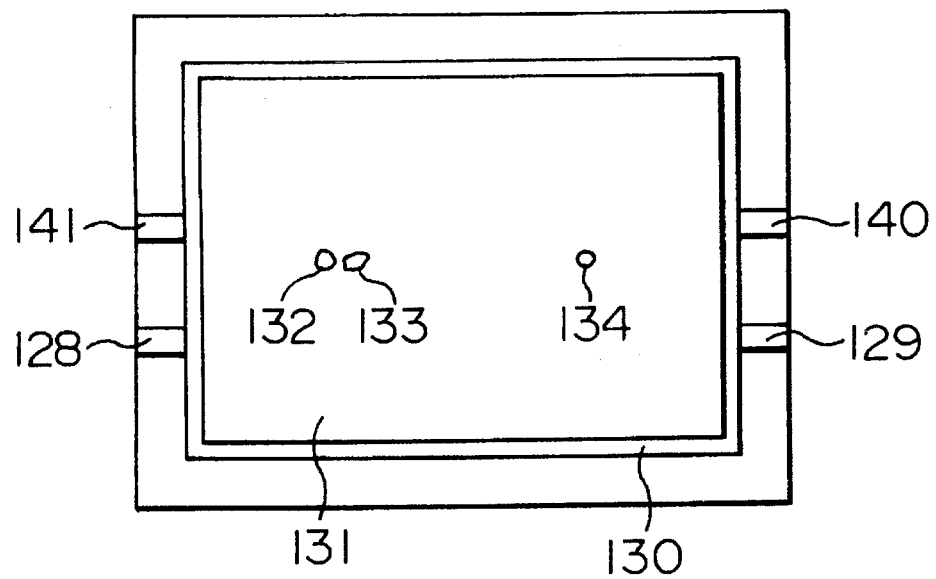
FIG. 20 is a plan view for indicating the optical probe used in the tunneling microscope of FIG. 15.

FIG. 15 schematically shows this fifth optical scanning type tunneling microscope. FIG. 16 is an enlarged view for showing an optical system employed in the fifth tunneling microscope. FIG. 17 is an enlarged sectional view of a probe holding unit employed in the fifth tunneling microscope. FIG. 18 is a sectional view of an optical probe employed in the fifth tunneling microscope. FIG. 19 and FIG. 20 are plan views of the optical probe. It should be understood that operations of the laser interferometer 27, the mirror 28, the z-stage 29, the x/y-stage 30, the piezoelectric elements 31, 33, the holder 32, and the probe holder 34 are the same as those of the above-explained first embodiment.

As illustrated in FIG. 15 and FIG. 16, light irradiated from the semiconductor laser 1 is focused by the lens 91, and then the focused light is coupled to an optical waveguide path 94 provided on the sample 93 from en edge surface thereof. This light is propagated through the optical waveguide path 94, and thus an evanescent wave 95 is generated from a surface of the sample 93 as shown in FIG. 17. In this case, it is assumed that an optical element having a light waveguide path as the sample 93. However, it is also possible to measure such an optical component as a lens and the like as the sample 64, and such a very small object of a cell of a biological object, made of a transparent substance as this sample 93. This evanescent wave 95 is picked up from the optical probe 121.

As shown in FIG. 17 and FIG. 18, the optical probe 121 has such a structure that $SiO_2$ layers 127 and 130, Al (aluminum) electrodes 128, 129, 140 and 141, and an Al light shielding layer 131 are stacked on an Si (silicon) substrate 126. Holes 132, 133 and 134 having sufficiently smaller sizes than the wavelength of the light projected from the semiconductor laser 1 are formed on the Al light shielding film 131, and evanescent waves are picked up or extracted from these holes. As a consequence, the evanescent wave 95 may be selectively picked up from the positions near the holes, and it is obtained such a resolution sufficiently smaller than the wavelength of the light irradiated from the semiconductor laser 1. In an Si substrate 126, an intrinsic Si layer 136 (simply referred to an "I layer 136" hereinafter) is epitaxial-grown on an N type silicon substrate 135 (simply referred to an "N type substrate 135" hereinafter), an N layer 137 formed by diffusing P (phosphor) over the I layer 136, and P layers 138, 139 formed by diffusing B (boron) are fabricated. To the N type substrate 136 and the P layers 138, 139, reverse biases are independently applied via the Al electrode 141 and the Al electrode 140 from the system controller 25, so that it may function as a so-called "PIN photodiode". The N layer 137 is shortcircuited with the N type substrate 135 to electrically separate the P layer 138 from the P layer 139.

In this fifth embodiment, the probe holder 34 is made of an insulating material, on which electrodes 123, 124, 125 are provided as illustrated in FIG. 17. The N type substrate 135 is connected via the electrode 124 to a cable 122, and the Al electrodes 128 and 129 are connected via the electrodes 123 and 125 to the cable 122, respectively. Although not shown in the drawing, the Al electrodes 140 and 141 are similarly connected to the cable 122. The cable 122 is connected to the system controller 25 so as to apply the reverse bias to the PIN photodiode on the silicon substrate 126, but also to conduct a current flown through the PIN photodiode to the system controller.

The light picked up from the hole 134 is incident upon the P layer 139. Accordingly, a current may flow between the N type substrate 135 and the P layer 139. This current becomes a current input to the system controller 25 via the cable 122. The system controller 25 performs a predetermined conversion to this current input, and supplies the converted current to the computer 25, so that this computer 25 stores this data. From this data intensity of the evanescent wave 95 generated near the hole 134 may be obtained. The hole 132 is located close to the hole 133. The light picked up from the hole 132 and the light picked up from the hole 133 are commonly incident upon the P layer 138, and will interfere with each other on the P layer 138. When the light picked up from the hole 132 and the light picked up from the hole 133 are mutually strengthened, a large current may flow between the N type substrate 135 and the P layer 138. Conversely, when the light picked up from the hole 132 and the light picked up from the hole 133 are mutually canceled, the current flowing between the N type substrate 135 and the P layer 138 becomes small. Also, this current is given a predetermined process by the system controller 25 and then is stored into the computer 24 in a similar manner to the current flowing between the N type substrate 135 and the P layer 139. When the three holes 132, 133, 134 are positioned close to each other, it may be recognized that the intensity of the light picked up from the respective holes is substantially constant. In this case, a phase difference between the above-described light picked up from the holes 132 and 133 can be calculated by comparing the current flowing through the N type substrate 135 and the P layer 138 with the current flowing through the N type substrate 135 and the P layer 139. In other words, a phase difference between the evanescent waves 95 generated near the holes 132 and 133 can be calculated. Similar to the third embodiment, since the phase becomes unstable when the phase difference of the light picked up from the holes 132 and 133 exceeds "π", the interval between the hole 132 and the hole 133 should be made smaller than λ/(2×N), assuming now that the wavelength of the light irradiated from the semiconductor laser 1 under vacuum condition is selected to be "λ", and the effective refractive index of the waveguide path 94 is selected to be N. Also similar to the third embodiment, since the interval between the hole 132 and the hole 133 is sufficiently smaller than the coherent distance of the ordinary semiconductor laser, no such an optical element as Fabry-Pérot interferometer etalon is required.

When the interval between the optical probe 121 and the sample 93 becomes wide, an amount of light picked up at the hole 134 is decreased. To the contrary, when this interval becomes narrow, the amount of light derived at the hole 134 is increased. Based upon this face, it is possible to measure the interval between the optical probe 121 and the sample 93 by checking the current flowing between the N type substrate 135 and the P layer 139. However, this interval measuring method is only effective under such a condition that the intensity of the evanescent waves is substantially constant in the region where the optical probe 121 is scanned.

As described in the above manner, a preselected region of the sample 93 is scanned by the optical probe 121, the phase difference and the intensity of the evanescent waves are measured, and also the interval between the optical probe 121 and the sample 93 is measured in synchronism with the scanning operation by the optical probe 11. The measurement results are recorded in the computer 24 and analyzed to obtain the shape of the sample 93 as well as the intensity distribution and the phase distribution of the peripheral light. An refractive index distribution of inside of the sample 93 may be predicted based upon the shape of the sample 93, and the intensity/phase distortions of the peripheral light. It should also be noted that the way to define the measuring points is similar to that of the third embodiment.

Figure 21:
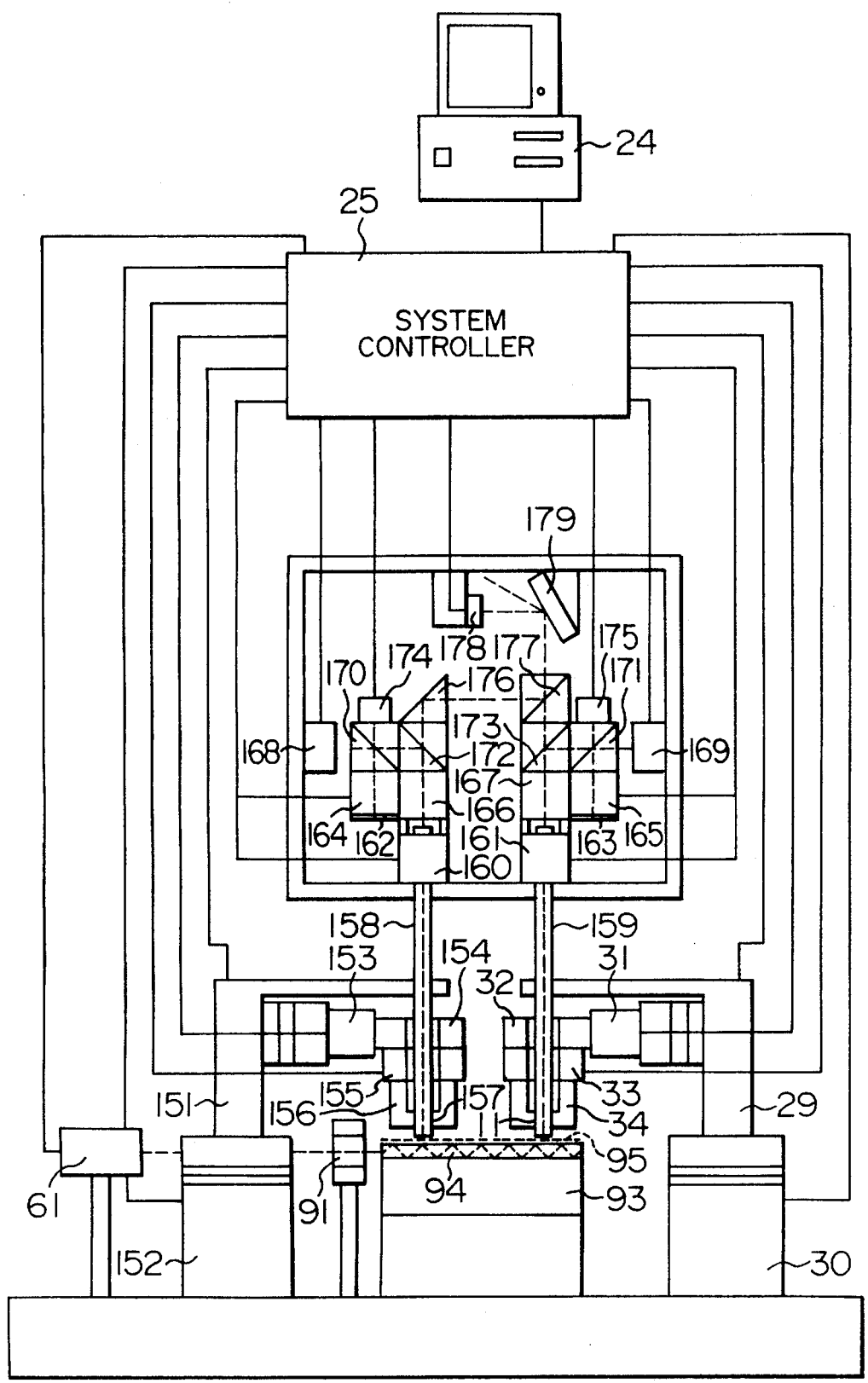
FIG. 21 schematically represents an optical system of an optical scanning type tunneling microscope according to a sixth embodiment of the present invention.

Referring now to FIG. 21, an optical scanning type tunneling microscope according to a sixth embodiment of the present invention will be described.

FIG. 21 schematically shows an optical system employed in this sixth optical scanning type tunneling microscope. It should be understood that operations of the z-stages 29, 151, the x/y-stages 30, 152 the piezoelectric elements 31,153, 33, 155 the holding members 32, 154, and the probe holding members 34, 156 are the same as those of the above-explained third embodiment. The optical probes 11 and 157 are fixed to the respective probe holder 34 and 156.

As illustrated in FIG. 21, light irradiated from the laser light source 61 is focused by the lens 91, and then the focused light is coupled to an optical waveguide path 94 provided on the sample 93 from en edge surface thereof. This light is propagated through the optical waveguide path 94, and thus an evanescent wave 95 is generated from a surface of the sample 93 as shown in FIG. 21. In this case, it is assumed that an optical element having a light waveguide path as the sample 93, made of a transparent substance as this sample 93. However, it is also possible to measure such an optical component as a lens and the like as the sample 64, and such a very small object of a cell of a biological object. This evanescent wave 95 is picked up from the optical probes 11, and 157. The respective optical probes 11 and 157 own such a structure that projections are provided with the cores of the optical fibers 158 and 159 as same as in the optical fiber 13 of the first embodiment. The evanescent waves 95 are selectively picked up from the narrow regions located from the projections. The light picked up at the optical probe 157 is propagated through the optical fiber 158, and then is incident upon the phase modulator 160. The phase 160 has the same structure as that of the phase modulator 22 explained in the first embodiment. The light passed through the phase modulator 160 is collimated by a rod lens 166, the collimated light passes through the beam splitter 172, and then is reflected at a reflection prism 176, so that the reflected light is finally incident upon the beam splitter 177.

Similar to the light picked up from the optical probe 157, the light picked up from the optical probe 11 passes through an optical fiber 159, a phase modulator 161, and a beam splitter 173 and thereafter is incident upon the beam splitter 177. For the sake of simple explanation in the sixth embodiment, it should be understood that the light picked up by the optical probe 11 and being incident upon the beam splitter 177 will be referred to "measuring light", whereas the light picked up by the optical probe 157 and being incident upon the beam splitter 177 will be referred to "reference light".

Similarly, when the optical fibers 11 and 157 are scanned, distortion given to the optical fibers 158 and 159 will be changed, whereby the optical paths of the optical fibers 158 and 159 are varied in this case. To avoid this difficulty, the following process is carried out. The wavelength of the light irradiated from the laser light source 168 is set to such a value approximated to the wavelength of the light radiated from the laser light source 1, namely slightly deviated. A portion of the light irradiated from the laser light source 168 is penetrated through the beam splitter 170, and another portion thereof is reflected by this beam splitter 170. The penetrated light is reflected at the beam splitter 172, and focused by the rod lens 166, and then is incident upon the optical fiber 158. This incident light passes through the phase modulator 160 and is reflected at an edge portion of the portion of the optical probe 157. The reflected light again passes through the phase modulation element 160 and the rod lens 166, is reflected by the beam splitter 172, and further is reflected by the beam splitter 170, and finally is incident upon the photo detector 174.

The light which has been irradiated from the laser light source 168 and reflected by the beam splitter 170, passes through a light intensity modulator 164, is reflected by a reflection film 162, and again passes through the light intensity modulator 164, and then passes through the beam splitter 170, finally enters into the photo detector 174. At the photo detector 174, the light reflected at the edge portion of the part of the optical probe 157 will interfere with the light reflected by the reflection film 162. When the optical path of the optical fiber 158 is changed by scanning the optical probe 157, the phase of the light reflected at the end portion of the part of the optical probe 157 will be shifted, and furthermore the output from the photo detector 174 will be varied. A variation in the optical paths of the optical fiber 158 may be recognized based upon a change in the outputs from the photo detector 174.

The system controller 25 supplies a current to the phase modulator 160 in response to the output derived from the photo detector 174, so that the phase of the light reflected at the edge portion of the optical probe 157 on the photo detector 174 is always maintained constant with regard to the light reflected from the reflection film 162. With such a measure, the optical path of the optical fiber 158 can be kept constant for the light irradiated from the laser light source 168. Since the wavelength of the light irradiated from the laser light source 168 is approximated to that irradiated from the laser light source 61, the optical path for the light picked up by the optical probe 157 may be maintained substantially constant.

The completely same operations can be realized among the optical fibers 158, 159; the phase modulation elements 160, 161; the reflection films 162, 163; the light intensity modulation elements 164, 165; the rod lenses 166, 167; the laser light sources 168, 169; the beam splitters 170, 171; the beam splitters 172, 173; and the photo detectors 174, 175. The optical path of the optical fiber 159 for the light detected by the optical probe 11 may be maintained substantially constant.

The measuring light incident upon the beam splitter 177 passes through the beam splitter 177, and the reference light is reflected by the beam splitter 177. Any of the above-described measuring light and reference light is entered into a diffraction grating 179, and then diffracted, and finally the diffracted light is incident upon the photo detector 178. Although the wavelength of the light emitted from the laser light source 61 is approximated with regard to that irradiated from the laser light sources 168 and 169, these wavelengths are different from each other. As a consequence, only the light irradiated from the laser light source 61 can be incident upon the photo detector 178. The measuring light will interfere with the reference light on the photo detector 178.

At a time instant when the optical probes 11 and 157 reach a position where a measurement is wanted to be carried out within a region scanned by these optical probes, the system controller 25 supplies the current to the phase modulator 160, and changes the optical path of the optical fiber 158 with the constant value by +λ/4 and −λ/4. By doing so, the phase of the reference light may be varied by +λ/2 and −λ/2.

In synchronism with this phase change, the outputs derived from the photo detector 178 are stored and analyzed by the computer, whereby both intensity and a phase difference between the light derived from the optical probes 11 and 157 can be detected. That is, both intensity and a phase difference between the evanescent waves generated near the projections at the tip portions of the optical probes 11 and 157 can be detected.

When the light irradiated from the laser light source 168 and reflected by the beam splitter 170 is interrupted by the light intensity modulator 164 (at this time, the light is not reflected, but may be absorbed), only the light reflected at the edge portion of the part of the optical probe 157 for the optical fiber 158 is incident upon the photo detector 174. The reflectivity at the edge portion of the optical probe 157 for the optical fiber 158 will be varied, depending upon the interval between the optical probe 157 and the sample 93. This variation in the reflectivity may cause the output from the photo detector 174 to be changed when the light is interrupted by the light intensity modulator 164.

Based upon the above-explained process, the interval between the sample 93 and the optical probe 157 can be calculated from the output of the photo detector 174 in case when the light is interrupted by the light intensity modulation element 164. The interval between the optical probe 11 and the sample 93 may be similarly calculated.

In case that the optical probes 11 and 157 are scanned, the operations of the light intensity modulators 164 and 165 are interrupted during the transportations. Then, the intervals between the sample 93 and the optical probes 11 and 157 is measured based upon the outputs from the photo detectors 174 and 175. While these intervals are made coincident with the instructed values of the computer 24, the optical probes 11 and 157 are transported to a target position thereof. At a time instant when the optical probes 11 and 157 reach their target position, the light intensity modulation elements 164 and 165 are brought into such a condition that the light can pass through these elements, and the optical paths of the optical fibers 158 and 159 are made coincident with predetermined values. Thereafter the optical path of the optical fiber 158 is varied by +λ/4 and −λ/4, and the output from the photo detector 178 is stored into the computer 25 in synchronism with this variation. While the surface of the sample 93 is scanned by the optical probes 11 and 157 in the above-described manner, the phase difference between the evanescent waves generated from arbitrary two points on the surface of the sample 93 can be investigated.

Figure 22:
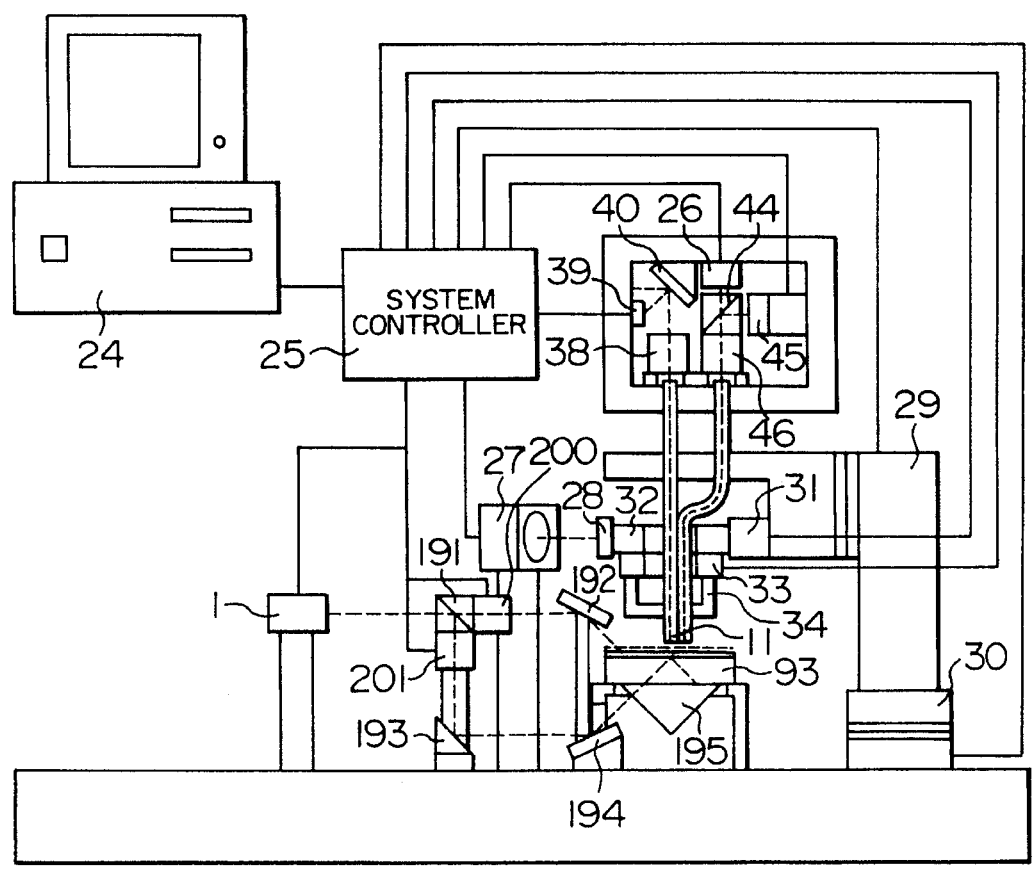
FIG. 22 schematically shows an optical system of an optical scanning type tunneling microscope according to a seventh embodiment of the present invention.
Figure 23:
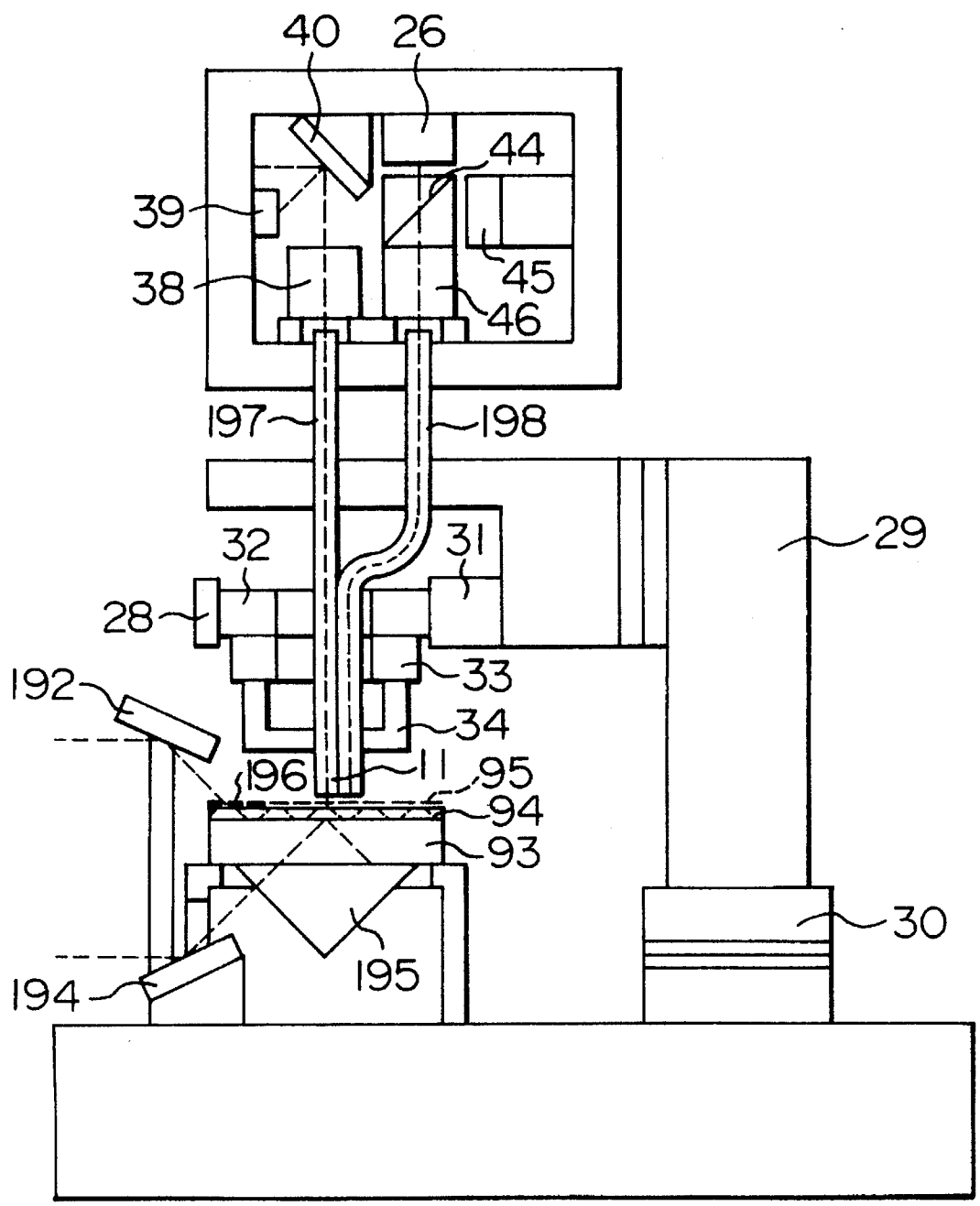
FIG. 23 is an enlarged view for showing the optical system employed in the tunneling microscope of FIG. 22.
Figure 24:
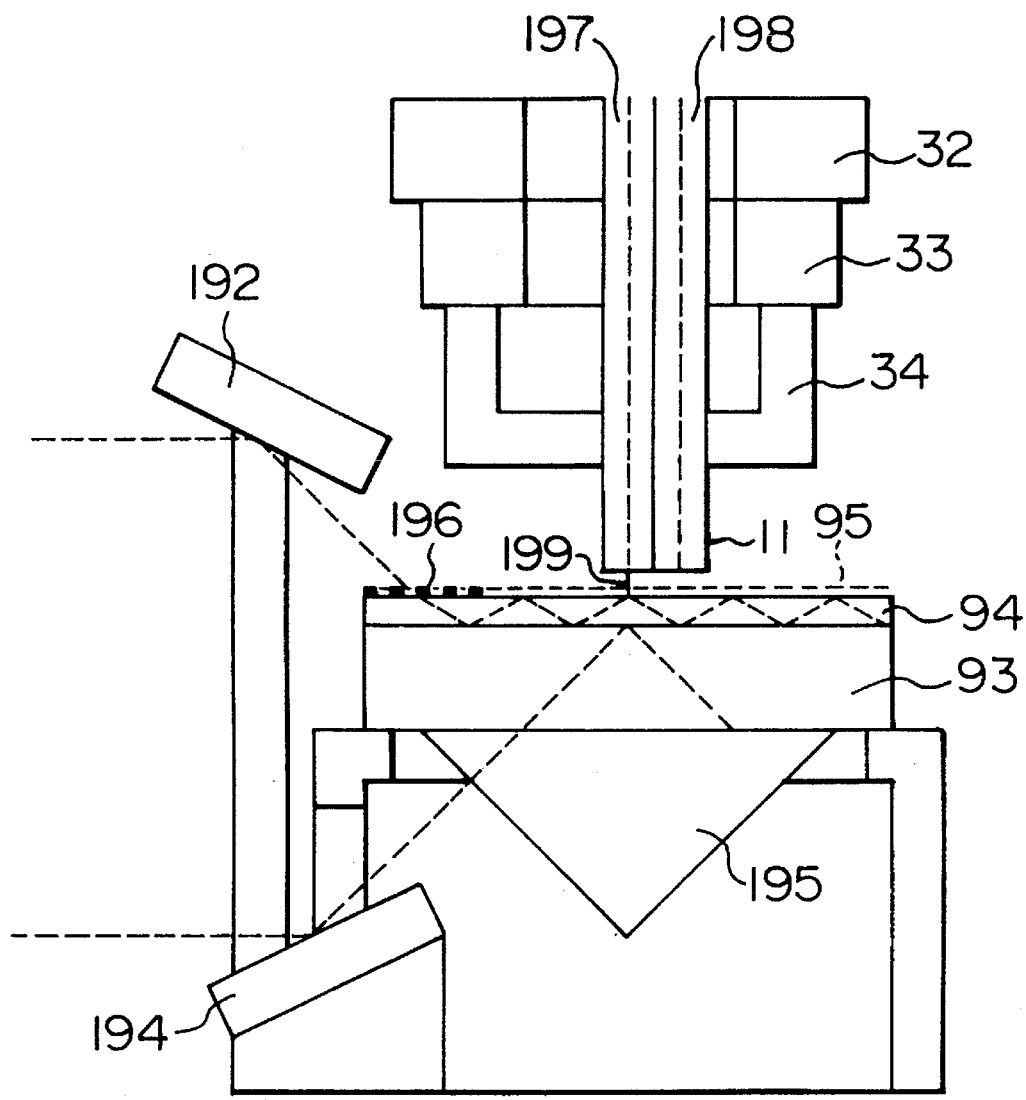
FIG. 24 is an enlarged view for indicating a probe tip portion and a peripheral portion thereof employed in the tunneling microscope of FIG. 22.

Referring now to FIG. 22, FIG. 23 and FIG. 24, an optical scanning type tunneling microscope according to a seventh embodiment of the present invention will be described.

FIG. 23 schematically shows an optical system employed in this seventh optical scanning type tunneling microscope. FIG. 23 is an enlarged view for showing this optical system. FIG. 24 is an enlarged view of a tip portion of an optical probe employed in the seventh tunneling microscope. It should understood that operations of the laser interferometer 27, the mirror 28, the z-stage 29, the x/y-stage 30, the piezoelectric elements 31, 33, the holding member 32, and the probe holding member 34 are the same as those of the above-explained first embodiment.

As represented in FIG. 22, the light irradiated from the semiconductor laser 1 is split into two light portions by an unpolorized beam splitter 191. The light transmitted through the beam splitter 191 is penetrated through a light intensity modulation element 200, is reflected by a mirror 192, and then is irradiated to the sample 93. This sample 93 owns an optical guidewave path 94 on a surface thereof, as illustrated in FIG. 23 and FIG. 24.

The light reflected from the mirror 192 is diffracted by a grating coupler 196 provided in a region when the reflection light from the mirror 192 on the optical waveguide path 94 is irradiated, and then is coupled to the optical waveguide path 94, and further is propagated through this optical waveguide path 94. It should be noted that since the grating coupler 196 owns very sever angle selecting characteristic, the incident angle is properly selected so as to couple the light to the optical waveguide path 94 under better conditions. It should also be noted that this light propagated through the optical waveguide path 94 is referred to "measuring light" in the following descriptions related to the seventh embodiment.

The light irradiated from the semiconductor laser 1 and reflected at the beam splitter 191 is penetrated through a light intensity modulator 201, is reflected by mirrors 193 and 194, and then is projected to the sample 93 via a prism 195. In this seventh embodiment the sample 93 is a parallel plate made of a transparent glass and having the optical waveguide path 94 on its one surface. At this time, the angles and the incident angles of the respective surfaces of the prism 195 are selected in such a manner that the light incident upon the sample 93 through the prism 195 may cause a total reflection on the surface of the optical waveguide path 94. It should be understood that the light projected via this prism 195 to the sample 93 will be called as "reference light" in the following description of the seventh embodiment. Both of the measuring light and the reference light may produce evanescent wave 95 on the surface of the optical waveguide path 94.

The optical system for projecting the reference light to the sample 93 is so designed that the polarizing direction of the evanescent wave formed by the measuring light is made coincident with the polarizing direction of the evanescent wave generated by the reference light, and also a difference in the optical paths of the measuring light and the reference light, defined from the beam splitter 191 to the optical probe 11 is made shorter than the coherent distance of the light irradiated from the semiconductor laser 1. Under such circumstances, the evanescent wave generated by the measuring light may interfere with the evanescent wave generated by the reference light. This evanescent wave 95 is picked up from the optical probe 11. The optical probe 11 has such a structure that optical fibers 197 and 198 are fused, and a projection 199 is provided at a tip portion of the optical fiber 197, and light is picked up from a portion of this projection 199. The functions and the forming method of this projection 199 are the same as those of the above-explained projection 17 employed in the first embodiment. The light derived from the optical probe 11 is propagated through the optical fiber 197, is collimated by the rod lens 38, and is diffracted by the diffraction grating 40, thereby being converted into an electric signal by the photo detector 39. This signal is stored via the system controller 25 into the computer 24.

At a time instance when the optical probe 11 reaches a position within a region to be scanned by this optical probe, in which the measurement is required to be carried out, the light intensity modulator 200 is brought into such a condition that the light can pass therethrough, and the light intensity modulator 201 is brought into such a condition that the light is cut out. As a result, only the evanescent wave generated by the measuring light is picked up by the optical probe 11. The intensity of this evanescent wave generated by the measuring light can be measured and this measured data is stored into the computer 24. Subsequently, the light intensity modulator 201 is brought into such a condition that the light can pass therethrough, whereas the light intensity modulation element 200 is brought into such a condition that the light is interrupted. Then, only the evanescent wave generated by the reference light is picked up, so that the intensity of the evanescent wave formed by the reference light can be measured, and this measured data is similarly stored into the computer 24. Furthermore, both of these light intensity modulation elements 200 and 201 are brought into such a condition that the light can pass therethrough. As a result, the evanescent wave formed by the measuring light will interfere with the evanescent wave generated by the reference light. The evanescent waves which have interferes are derived by the optical probe 11, and the intensity thereof is measured and thereafter stored into the computer 24. Thus, based upon the intensity of evanescent waves independently generated by the reference light and the measuring light and furthermore the intensity of the evanescent waves under interference conditions, a phase difference between the reference light and the measuring light can be investigated.

The phase of the evanescent wave generated by the reference light may be known by setting such a condition that precision in the respective surfaces of the beam splitter 191, the mirrors 193, 194, the prism 195, and the sample 93 is set to sufficiently high (degrees of this precision may be determined by performing the optical scanning by this tunneling microscope under preset precision), the angles among the respective surfaces of the prism 195, and also the incident angle of the reference light. The phase of the measuring light can be detected based upon the known phase of the evanescent wave formed by the reference light and also the known phase difference between the evanescent wave formed by the reference light and the evanescent wave generated by the measuring light.

The functions of an optical fiber 198 are identical to those of the optical fiber 12 employed in the first embodiment. The interval between the probe 11 and the sample 93 may be measured based upon the output from the photo detector 45 in a similar manner to that of the first embodiment.

A preselected region on the surface of the sample 93 is scanned by the optical probe 11, and the above-explained operation is carried out at a predetermined measurement point, and then the measurement result is stored in the computer 24. The shape of the surface of the sample 93, and the intensity distribution as well as the phase distribution of the measuring light can be calculated by analyzing this measurement result.

In accordance with the present invention, it is possible to acquire the phase information of the light about a region having a very small dimension, as compared with the wavelength of the light generated from the light source. Also, a wave front or co-planed line of light which has been enclosed in an optical waveguide path, can be measured, which could not be measured in the conventional measuring method by the experimental method. As a consequence, it is possible to realize such an optical scanning type tunneling microscope capable of measuring the phase information of the light about a very small region on a surface of a sample, and also capable of measuring the optical path.

We claim:

1. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for protecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical scanning type tunneling microscope further comprises splitting means for splitting the light irradiated from said light source into reference light and measuring light before projecting said light to the sample;

projecting means for projecting at least a portion of said measuring light to said sample;

interfering means for causing said measuring light picked up from said optical probe and reference light; and said detector detects said interference light, thereby deriving phase information about the light picked up from said optical probe.

2. An optical scanning type tunneling microscope as claimed in claim 1, further comprising:

detecting means for detecting a phase shift of the reference light incident upon said interfering means, which is caused by scanning the optical probe.

3. An optical scanning type tunneling microscope as claimed in claim 1, further comprising:

a phase modulator for modulating a phase of the reference light.

4. An optical scanning type tunneling microscope as claimed in claim 1, further comprising:

an intensity modulator for modulating intensity of the reference light.

5. An optical scanning type tunneling microscope as claimed in claim 1, wherein an optical fiber is employed so as to conduct the reference light to said interfering means.

6. An optical scanning type tunneling microscope as claimed in claim 1, wherein said optical probe has either one, or plural projections made of a transparent material and having a sharp edge portion.

7. An optical scanning type tunneling microscope as claimed in claim 1, wherein said optical probe has either one, or plural projections made of a transparent material and having sharp edge portions, and a radius of curvature about at least one tip portion of said projections is smaller than a wavelength of the light irradiated from the light source.

8. An optical scanning type tunneling microscope as claimed in claim 1, wherein said optical probe has such a structure that either a hollow object made of an opaque substance, or a transparent substance to which an opaque substance is attached, and said opaque substance owns either one, or a plurality of very small holes.

9. An optical scanning type tunneling microscope as claimed in claim 1, wherein said optical probe has such a structure that either a hollow object made of an opaque substance, or a transparent substance to which an opaque substance is attached, and said opaque substance owns either one, or a plurality of very small holes, and furthermore a dimension of at least one of said plural holes is shorter than a wavelength of the light irradiated from said light source.

10. An optical scanning type tunneling microscope as claimed in claim 1, wherein said optical probe has such a structure that a dielectric film is formed on a semiconductor substrate, and a film made of an opaque substance having either one, or a plurality of very small holes is formed on said dielectric film, and furthermore a photodetector for converting the picked up light into an electric signal is integrated on a portion under said plurality of very small holes on said semiconductor substrate.

11. An optical scanning type tunneling microscope as claimed in claim 1, wherein said optical probe has such a structure that a dielectric film is formed on a semiconductor substrate, and a film made of an opaque substance having either one, or a plurality of very small holes is formed on said dielectric film, a dimension of at least one of said very small holes is shorter than a wavelength of the light irradiated from said light source, and furthermore a light detector for converting the derived light into an electric signal is integrated on a portion under said plurality of very small holes on said semiconductor substrate.

12. An optical scanning type tunneling microscope as claimed in claim 1, further comprising:

phase detecting means for detecting a phase shift of the reference light incident upon said interfering means, said phase shift being caused by scanning said optical probe;

a phase modulator for modulating the phase of said reference light; and reference light stabilizing means including a phase modulator for modulating the phase of said reference light, for driving said phase modulator based upon the detection result of said phase detecting means, whereby the phase of said reference light incident upon said interfering means is always maintained constant.

13. An optical scanning type tunneling microscope as claimed in claim 1, further comprising:

polarization adjusting means for adjusting a polarization condition of either said reference light, or said measuring light, which is incident upon said interfering means.

14. An optical scanning type tunneling microscope as claimed in claim 1, wherein a dimension of partial region near a sample surface where said optical probe selectively picked up transmitted light, reflected light, scattered light, or an evanescent wave generated near said sample, is selected to be shorter than a wavelength of the light irradiated from said light source.

15. An optical scanning type tunneling microscope as claimed in claim 1, wherein said scanning mechanism is arranged by a coarse moving mechanism and a fine moving mechanism;

a scanning range of said coarse moving mechanism is greater than a scanning range of said fine moving mechanism; and positioning precision of said coarse moving mechanism is smaller than a scanning range of fine mechanism.

16. An optical scanning type tunneling microscope as claimed in claim 1, wherein said upward/downward moving mechanism is arranged by a coarse moving mechanism and a fine moving mechanism;

a scanning range of said coarse moving mechanism is greater than a scanning range of said fine moving mechanism; and positioning precision of said coarse moving mechanism is smaller than a scanning range of fine mechanism.

17. An optical scanning type tunneling microscope as claimed in claim 1, wherein an optical element having an optical waveguide path is employed as said sample, at least a portion of said light irradiated from said light source is projected in such a manner that said light portion is propagated through said optical waveguide path, and an evanescent wave of said light portion propagated through said optical waveguide path is derived by said optical probe.

18. An optical scanning type tunneling microscope as claimed in claim 1, further comprising:

stabilizing means for stabilizing the light irradiated from a semiconductor laser, said semiconductor laser being employed as said light source.

19. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe is made of a transparent substance, and has a plurality of sharp projections at a tip portion thereof, and also is capable of deriving phase information about at least one of said transmitted light, said reflected light, said scattered light, and said evanescent wave generated near said sample.

20. An optical scanning type tunneling microscope as claimed in claim 19, wherein said optical probe owns at least one projection whose radius curvature is shorter than a wavelength of the light irradiated from the light source.

21. An optical scanning type tunneling microscope as claimed in claim 19, wherein at least one of intervals among said plurality of sharp projections provided on said optical probe is shorter than a wavelength of the light irradiated from said light source.

22. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for protecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe has such a structure that one of a hollow object made of an opaque substance, and a transparent substance to which an opaque substance is attached, and said opaque substance owns one of one, and a plurality of very small holes, and also said optical probe derives phase information about at least one of said transmitted light, said reflected light, said scattered light, and said evanescent wave generated near said sample.

23. An optical scanning type tunneling microscope as claimed in claim 22, wherein said optical probe has at least one small hole having a dimension shorter than a wavelength of the light irradiated from said light source.

24. An optical scanning type tunneling microscope as claimed in claim 22, wherein at least one interval among intervals of said plurality of very small holes provided in said optical probe is shorter than a ½ wavelength of the light irradiated from said light source.

25. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe has such a structure that a dielectric film is formed on a semiconductor substrate, and a film made of an opaque substance having one of one, and a plurality of very small holes is formed on said dielectric film, and furthermore a photodetector for converting the derived light into an electric signal is integrated on a portion under said plurality of very small holes on said semiconductor substrate, whereby said optical probe is capable of deriving phase information about at least one of said transmitted light, said reflected light, said scattered light, and said evanescent wave generated near said sample.

26. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

a plurality of said optical probes are employed, at least portions of said plurality of light picked up from said respective optical probes are caused to interfere with each other for a detection purpose, thereby deriving phase information about at least one of said transmitted light, said reflected light, and said evanescent wave near said sample.

27. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said light irradiated from said light source is split into a plurality of light before being projected to said sample, and at least two sets of said split plural light are projected to said sample along two different directions.

28. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe is capable of deriving phase information about at least one of said transmitted light, said reflected light, said scattered light, and said evanescent wave generated from said sample, or near said sample.

29. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe has such a structure that a dielectric film is formed on a semiconductor substrate, and a film made of an opaque substance having one of one, and a plurality of very small holes is formed on said dielectric film, and furthermore said photo detector is integrated on a portion under said plurality of very small holes on said semiconductor substrate.

30. An optical scanning type tunneling microscope as claimed in claim 29, wherein a dimension of said very small hole is shorter than a wavelength of the light irradiated from said optical source.

31. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe has a plurality of sharp projections made of a transparent substance at edge portions thereof, and is capable of deriving phase information about at least one of transmitted light, reflected light, scattered light, and an evanescent wave generated near said sample.

32. An optical probe as claimed in claim 31, wherein said optical probe owns at least one projection whose radius curvature is shorter than a wavelength of the light irradiated from said light source.

33. An optical probe as claimed in claim 31, wherein at least one of intervals among said plurality of sharp projections provided on said optical probe is shorter than a half of a wavelength of the light irradiated from said light source.

34. An optical probe as claimed in claim 31, wherein a dimension of a partial region near a sample surface where said optical probe selectively derives transmitted light, reflected light, scattered light, or an evanescent wave generated near said sample, is selected to be shorter than a wavelength of the light irradiated from said light source.

35. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe has such a structure that one of a hollow object made of an opaque substance, and a transparent substance to which an opaque substance is attached, and said opaque substance owns one of one, and a plurality of very small holes.

36. An optical probe as claimed in claim 35, wherein said optical probe owns at least one hole having a dimension shorter than a wavelength of the light irradiated from the light source.

37. An optical probe as claimed in claim 35, wherein at least one of intervals for said plurality of very small holes formed in said optical probe is shorter than a ½ wavelength of the light irradiated from said light source.

38. An optical scanning type tunneling microscope comprising:

a light source;

an optical system for projecting light irradiated from said light source to a sample;

an optical probe for selectively picking up at least one of transmitted light, reflected light, scattered light generated from said sample by receiving said light, and an evanescent wave generated near said sample by receiving said light, from a region of a portion located near a surface of said sample, said optical probe being separate from said optical system for projecting light irradiated from said light source to said sample;

a scanning mechanism for scanning said optical probe along said sample surface;

an upward/downward moving mechanism for moving said optical probe along a direction substantially perpendicular to said sample surface;

a photo detector for detecting the light picked up by said optical probe;

interval measuring means for measuring an interval defined between said sample surface and said optical probe;

a control circuit for driving said upward/downward mechanism in order that said interval is maintained constant based upon the output of said interval measuring means;

a scanning circuit for driving said scanning mechanism in order that a predetermined region of said sample surface is scanned by said optical probe; and a process circuit for recording the output from said photo detector and for extracting information about said sample based upon said recorded output in synchronism with the scanning operation of said optical probe, wherein;

said optical probe has such a structure that a dielectric film is formed on a semiconductor substrate, and a film made of an opaque substance having one of one, and a plurality of very small holes is formed on said dielectric film, and furthermore a photodetector for converting the derived light into an electric signal is integrated on a portion under said plurality of very small holes on said semiconductor substrate.

39. An interferometer, comprising:

a light source;

splitting means for splitting a light emitted from said light source into a plurality of split lights;

irradiating means for irradiating a sample with at least one first light in said plurality of split lights;

at least one optical probe for selectively picking up at least one of a transmitted light, a reflecting light, a scattering light and an evanescent wave present near said sample, which is caused by irradiating said sample with said at least one first light, from a region having a dimension equal to, or shorter than a wavelength of said light emitted from said light source, said at least one optical probe being separate from said irradiating means;

interfering means for causing a second light in said plurality of split lights to interfere with at least one of said transmitted light, reflecting light, scattering light and evanescent wave thus picked up; and detecting means for detecting lights thus interfered.

40. An interferometer as claimed in claim 39, further comprising transport means for transporting said optical probe.

41. An interferometer as claimed in claim 39, wherein said detecting means enables detection of a phase distribution of light in a region near said sample.

42. An interferometer, comprising:

a light source;

irradiating means for irradiating a sample with a light from said light source;

a plurality of optical probes for selectively picking up said light from a space, at least one first optical probe in said plurality of optical probes selectively picks up at least one of a transmitted light, a reflecting light, a scattering light and an evanescent wave present near said sample, which is caused by irradiating said sample with said light, from a region having a dimension equal to, or shorter than a wavelength of said light;

interfering means for interfering at least one of said transmitted light, reflecting light, scattering light and evanescent wave thus picked up by said first optical probe with a light picked up by a second optical probe in said plurality of optical probes; and detecting means for detecting lights thus interfered.

43. An interferometer as claimed in claim 42, wherein said detecting means enables detection of a phase distribution of light in a region near said sample.

44. An interferometer as defined in claim 42, wherein said at least one first optical probe is separate from said irradiating means.

* * * * *